US011482815B2

(12) United States Patent
Karjala

(10) Patent No.: US 11,482,815 B2
(45) Date of Patent: *Oct. 25, 2022

(54) DIN RAIL SHIELD

(71) Applicant: BAKC Capital Group, Suwanee, GA (US)

(72) Inventor: Bruce Karjala, Suwanee, GA (US)

(73) Assignee: BAKC Capital Group, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/189,894

(22) Filed: Mar. 2, 2021

(65) Prior Publication Data

US 2021/0184406 A1 Jun. 17, 2021

Related U.S. Application Data

(63) Continuation of application No. 16/587,520, filed on Sep. 30, 2019, now Pat. No. 10,971,864.

(51) Int. Cl.
*H01R 9/03* (2006.01)
*H01R 13/6593* (2011.01)
(Continued)

(52) U.S. Cl.
CPC ..... *H01R 13/6593* (2013.01); *H01R 13/6581* (2013.01); *H02B 1/052* (2013.01)

(58) Field of Classification Search
CPC .. H01R 25/142; H01R 13/518; H01R 13/514; H01R 13/658; H01R 13/6593;
(Continued)

(56) References Cited

U.S. PATENT DOCUMENTS 2,707,203 A * 4/1955 Peters .................. H02G 3/16
174/59
4,696,649 A 9/1987 Smorzaniuk et al.
(Continued)

FOREIGN PATENT DOCUMENTS

EP 2992571 B1 6/2017
EP 2589275 B1 4/2018
JP 2019061885 A 4/2019

OTHER PUBLICATIONS

Southwire®: "Southwire Variable Frequency Drive Shield Termination Kit;" SPEC 85451; Southwire Company, LLC.; Sep. 26, 2019. http://industrial.southwire.com/en/cablespec/download_spec/?spec=85451.
(Continued)

*Primary Examiner* — Thanh Tam T Le

(74) *Attorney, Agent, or Firm* — Harness, Dickey & Pierce, P.L.C.

(57) ABSTRACT

A shield device includes: a first electrical conductor; an electrical insulator that is configured to electrically insulate the first electrical conductor from a second electrical conductor; a first shield connector configured to: directly contact at least 180 degrees of a first circumference of a first shield that surrounds at least two first insulated conductors of a first section of a shielded cable; and electrically connect the first shield with the first electrical conductor; and a second shield connector configured to: directly contact at least 180 degrees of a second circumference of a second shield that surrounds at least two second insulated conductors of a second section of the shielded cable; and electrically connect the second shield with the first electrical conductor.

22 Claims, 24 Drawing Sheets

(51) Int. Cl.
H01R 13/6581 (2011.01)
H02B 1/052 (2006.01)

(58) Field of Classification Search
CPC .... H01R 13/6581; H01R 9/24; H01R 9/2675; H01R 9/26; H01R 9/2408
See application file for complete search history.

(56) References Cited

U.S. PATENT DOCUMENTS

| | | | | |
|---|---|---|---|---|
| 4,886,464 | A | * | 12/1989 | Zetena, Jr. ............. H01R 9/223 |
| | | | | 174/59 |
| 5,854,444 | A | | 12/1998 | Fehlhaber |
| 6,146,213 | A | * | 11/2000 | Yoon .................... H01R 9/2616 |
| | | | | 439/716 |
| 6,292,076 | B1 | | 9/2001 | DeGrazia et al. |
| 6,464,538 | B2 | | 10/2002 | Miyazaki et al. |
| 6,648,692 | B1 | | 11/2003 | Gillrath et al. |
| 7,047,406 | B2 | * | 5/2006 | Schleicher .......... H04L 63/0823 |
| | | | | 713/168 |
| 7,491,084 | B2 | * | 2/2009 | Wedler ................ H01R 9/2416 |
| | | | | 439/716 |
| 9,196,976 | B2 | * | 11/2015 | De France ......... H01R 13/6581 |
| 10,340,668 | B2 | * | 7/2019 | Siehler ................... H02B 1/052 |
| 10,727,616 | B2 | * | 7/2020 | Gudgel .................. H01R 9/24 |
| 10,971,864 | B1 | * | 4/2021 | Karjala ............. H01R 13/6581 |
| 11,234,515 | B2 | * | 2/2022 | Ofenloch ............. H02B 1/0523 |
| 2004/0165357 | A1 | | 8/2004 | Schneeberger |

OTHER PUBLICATIONS

"VFD Termination Kit Installation": Southwire, Informational video on the recommendation installation method of Southwire's VFD Termination Kit. Published on Mar. 12, 2019: https://youtu.be/MWwaK2ZVebY.

International Search Report and Written Opinion for International Application No. PCT/US2020/053001 dated Jan. 15, 2021.

* cited by examiner

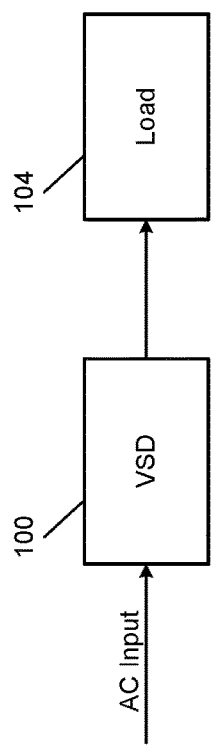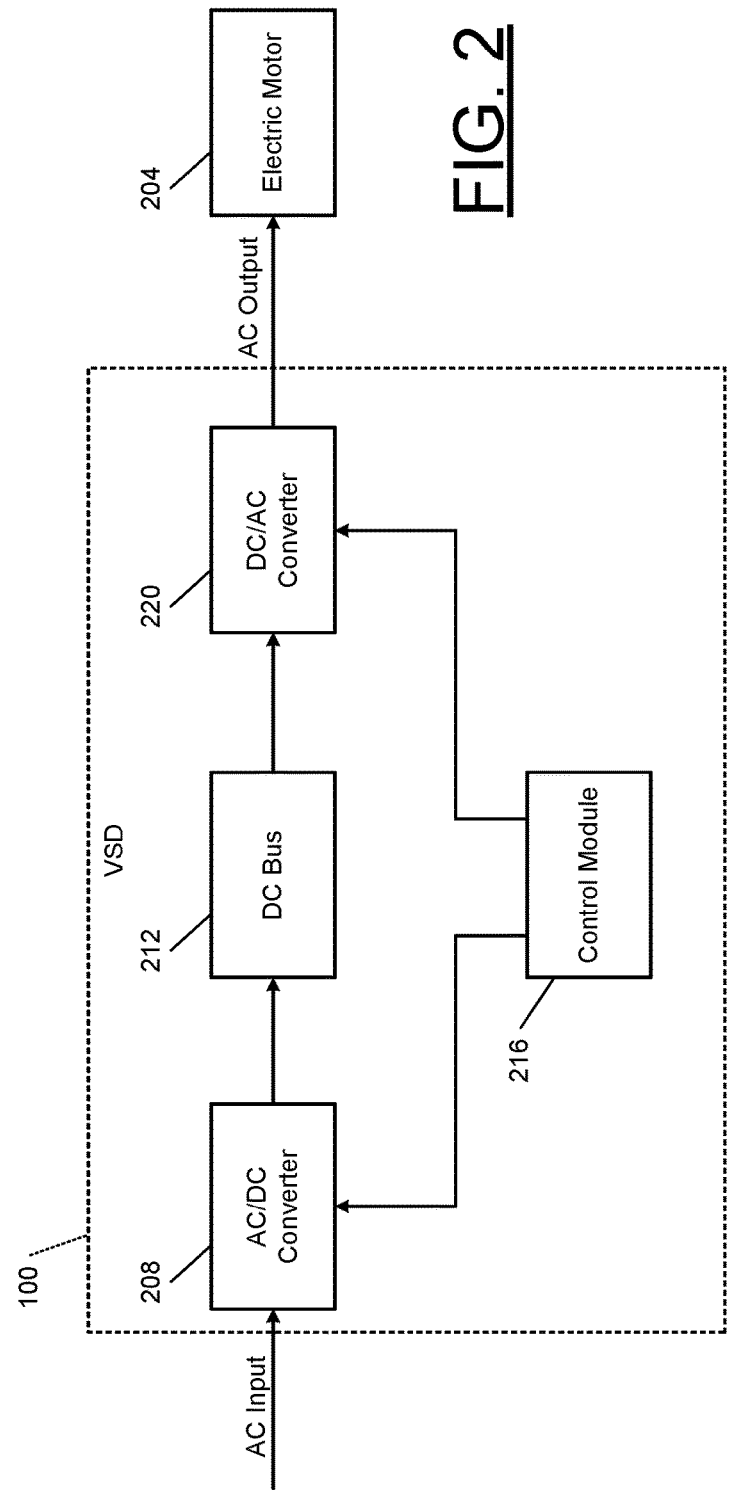

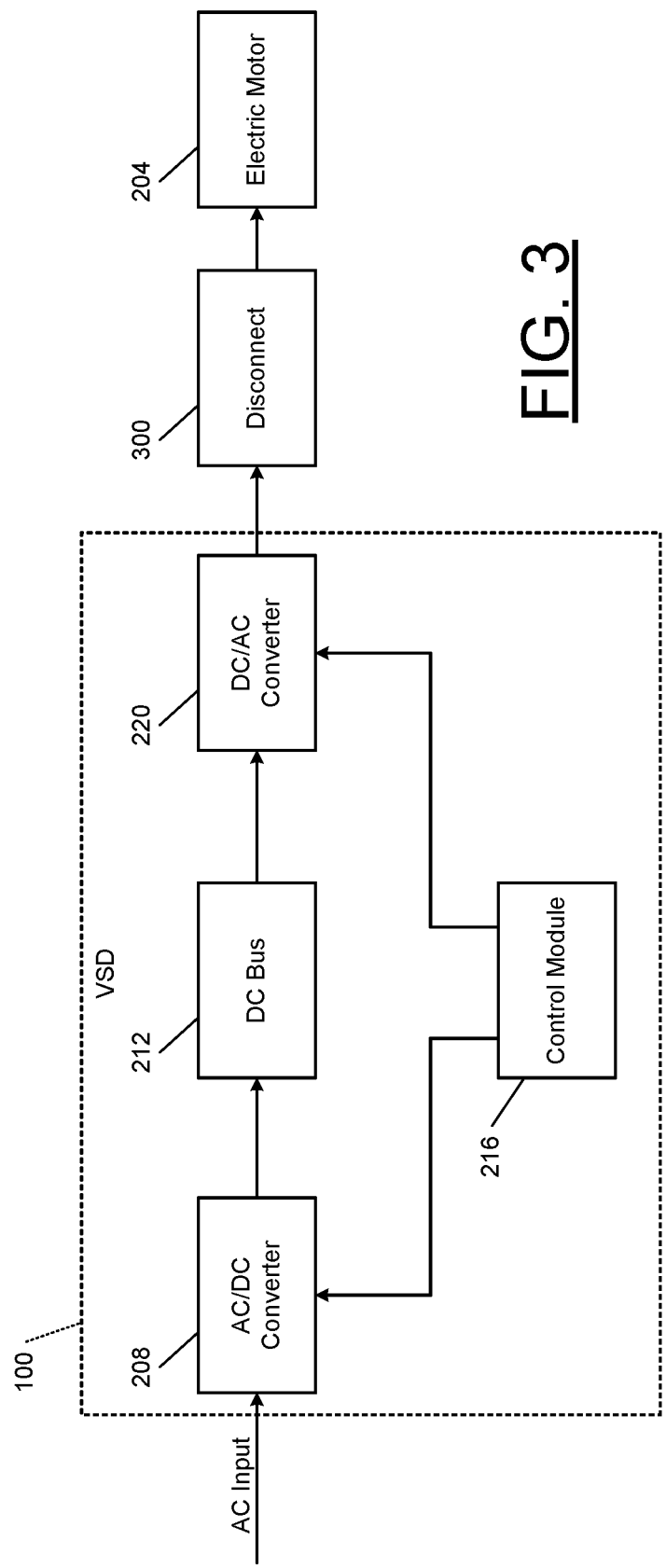

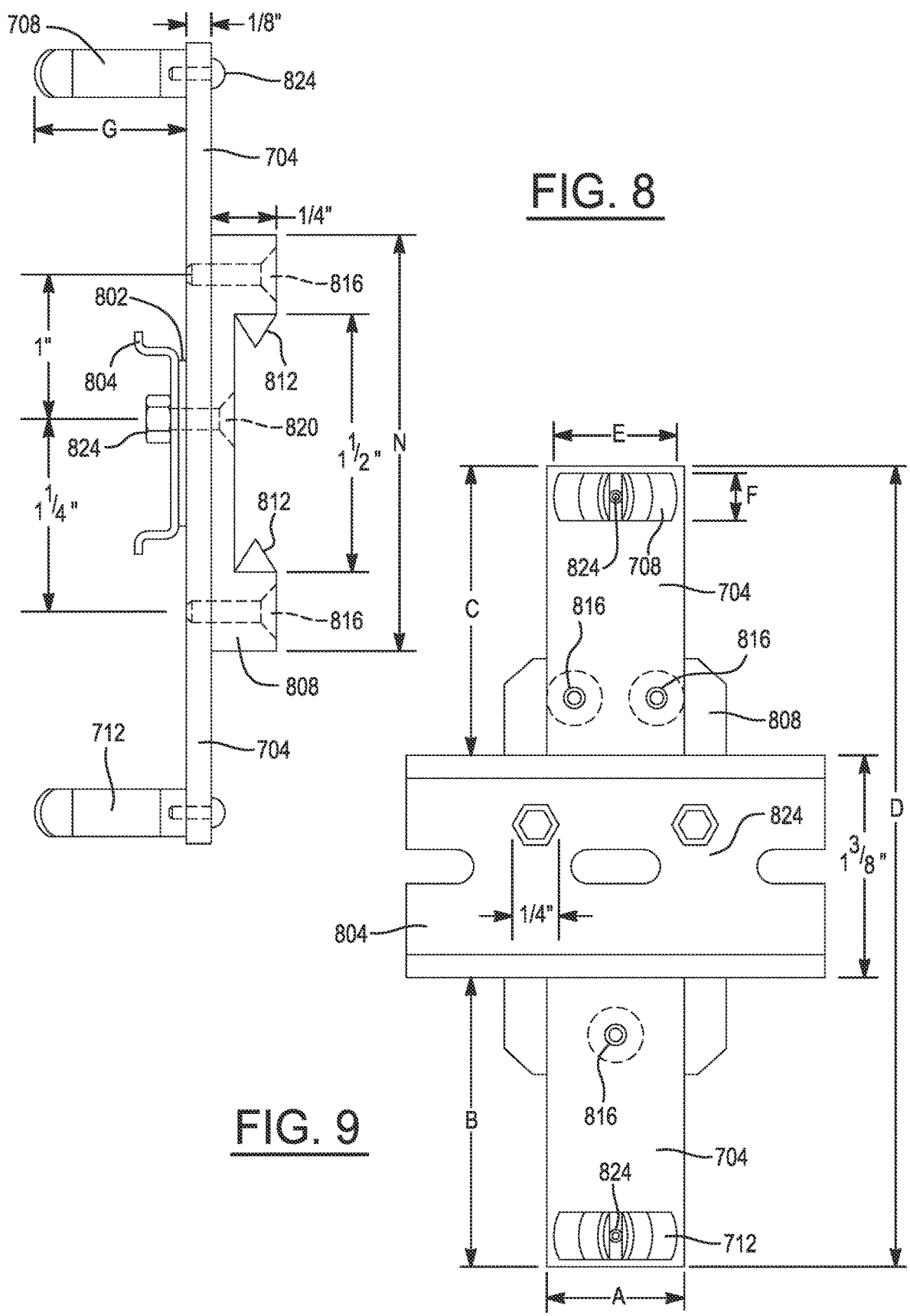

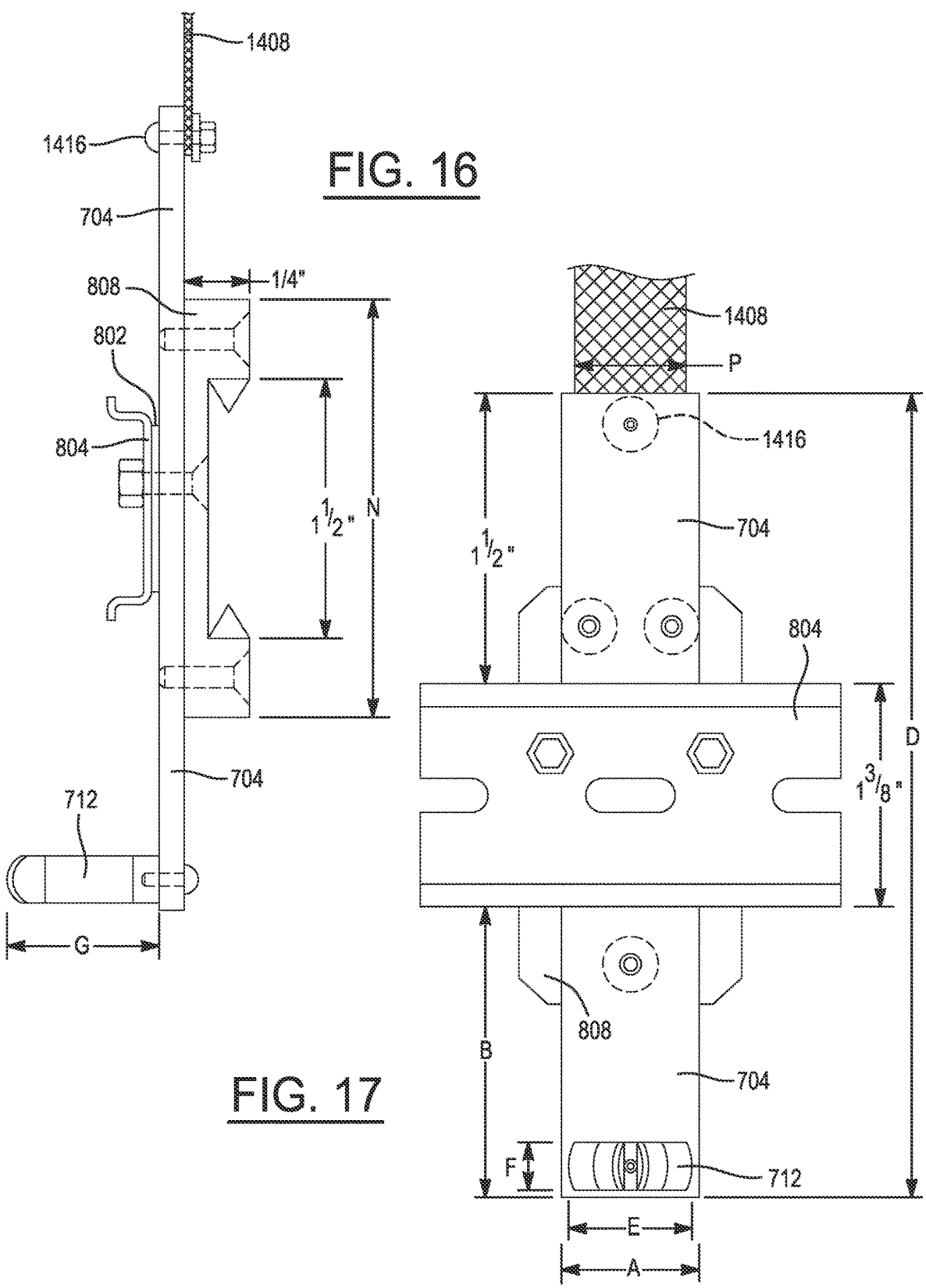

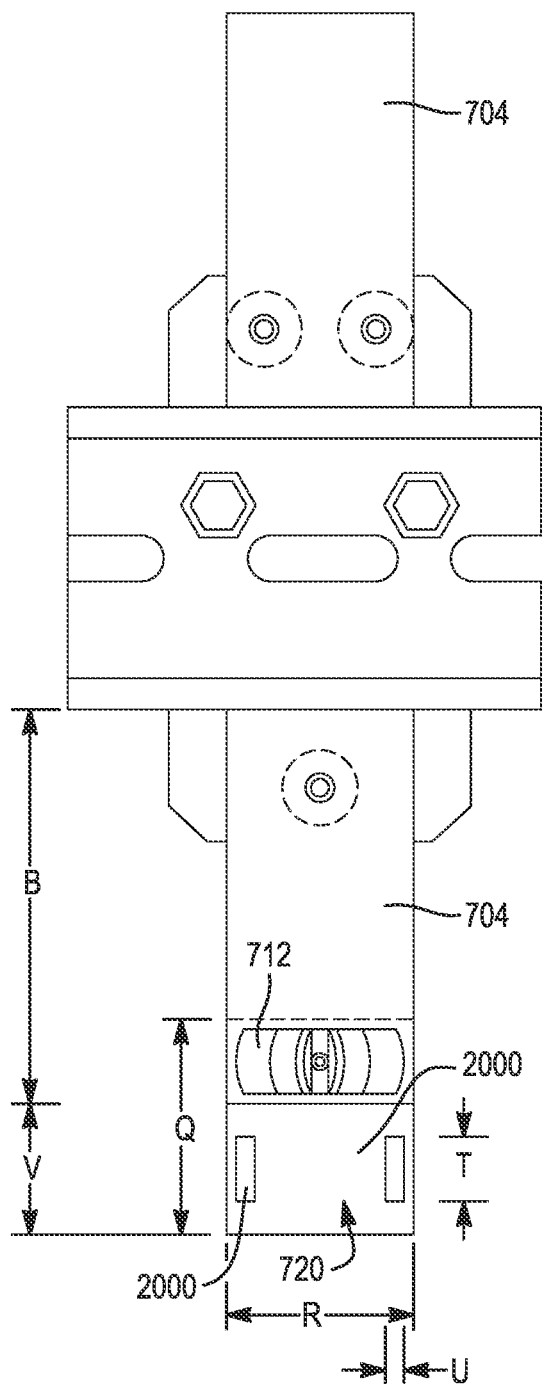
FIG. 21
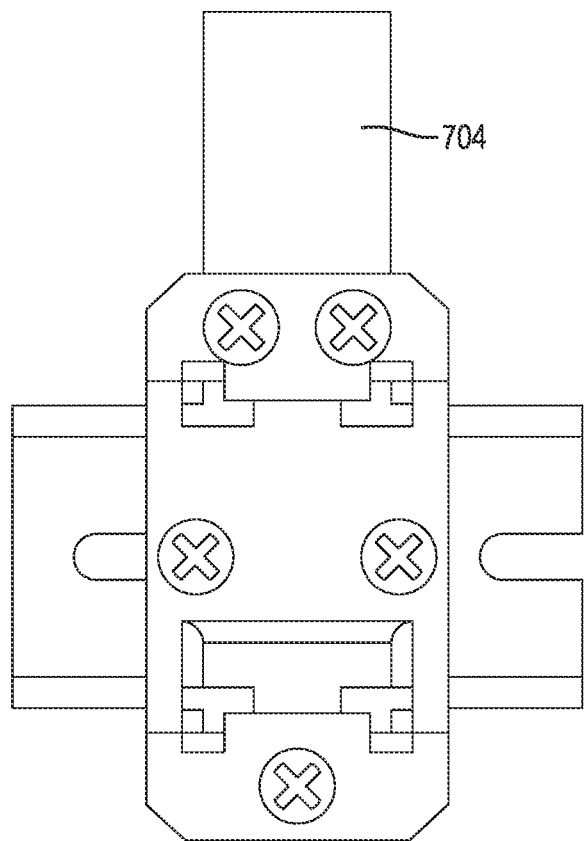
FIG. 20
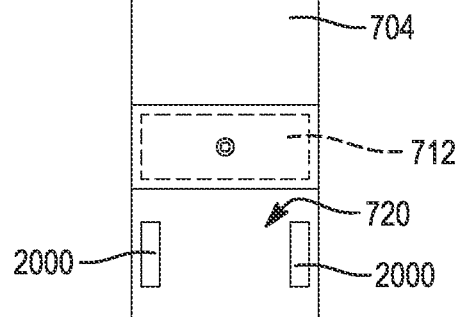

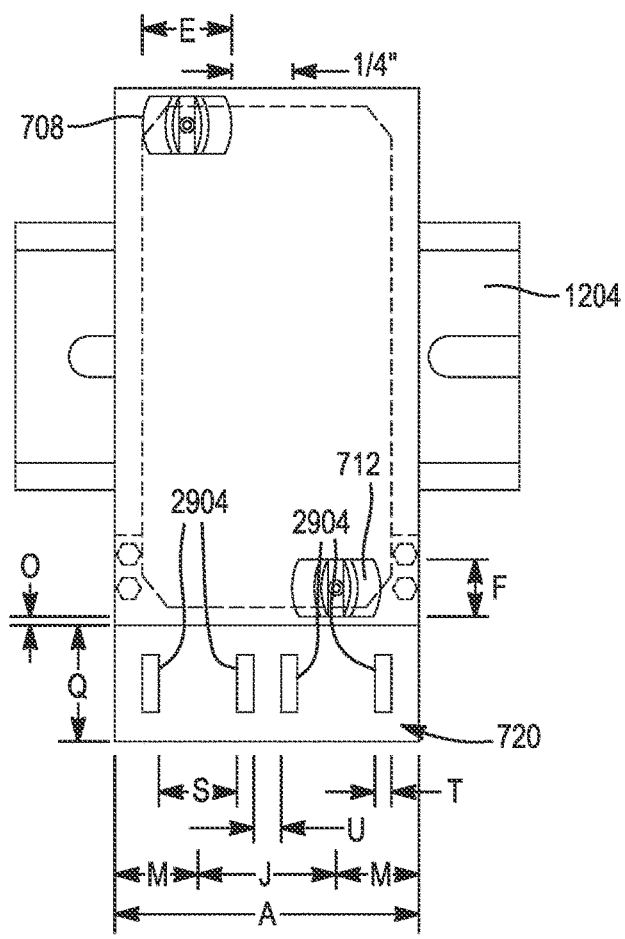
FIG. 29
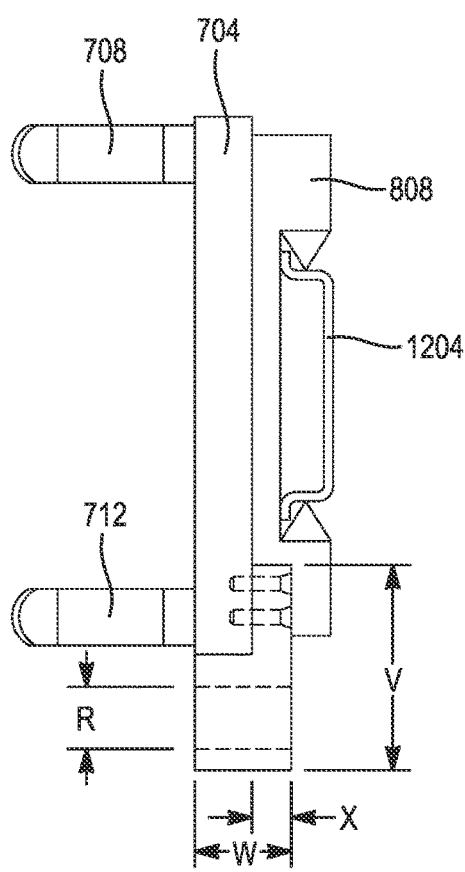
FIG. 30
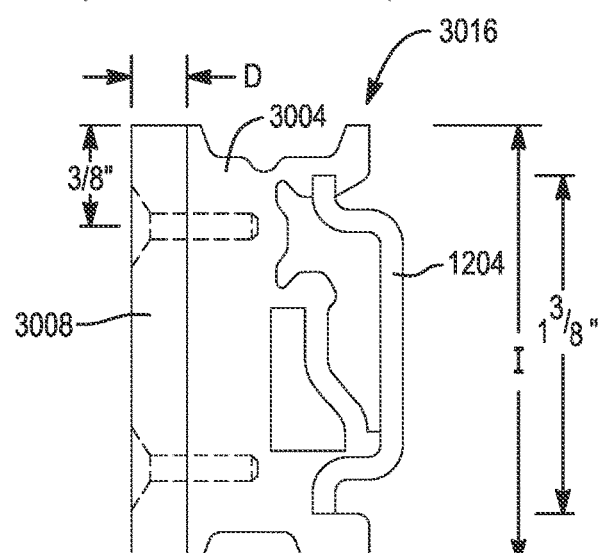
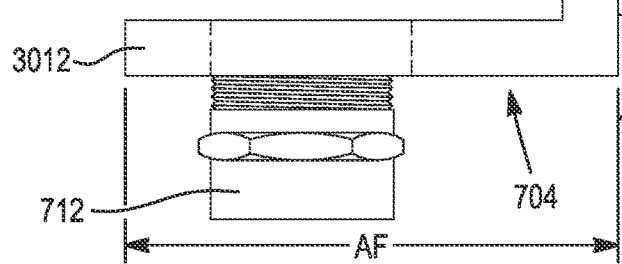
FIG. 31

DIN RAIL SHIELD

CROSS-REFERENCE TO RELATED APPLICATIONS

The present disclosure is a continuation of U.S. patent application Ser. No. 16/587,520 filed on Sep. 30, 2019. The entire disclosure of the application referenced above is incorporated herein by reference.

FIELD

The present disclosure relates to electrical conductors and more particularly to electrical shield devices.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Variable speed drives (VSDs) can also be referred to as adjustable speed drives (ASDs). VSDs may include insulated gate bipolar transistors (IGBTs) due to their lower switching losses, smaller package sizes, and lower cost than other types of switching devices.

VSDs can power various different types of electrical loads and are used in various different types of industries, such as automotive, food and beverage, mining, energy, theater, automatic car washes, heating ventilation and air conditioning (HVAC), and other industries.

SUMMARY

In a feature, a shield device includes: an electrical conductor; an electrical insulator that is configured to electrically insulate the electrical conductor from a DIN rail and to hang the shield device from the DIN rail; a first shield connector configured to: directly contact at least 180 degrees of a first circumference of a first shield that surrounds at least two insulated conductors of a first section of a shielded cable; and electrically connect the first shield with the electrical conductor; and a second shield connector configured to: directly contact at least 180 degrees of a second circumference of a second shield that surrounds at least two insulated conductors of a second section of the shielded cable; and electrically connect the second shield with the electrical conductor.

In further features, the electrical conductor has uniform length, width, and thickness.

In further features, the electrical conductor is planar.

In further features, the shield device further includes a second electrical insulator located between the electrical conductor and a second DIN rail and configured to electrically insulate the electrical conductor from the second DIN rail.

In further features, the shield device further includes the second DIN rail.

In further features, the second DIN rail is configured to hang one or more terminal blocks from the second DIN rail.

In further features, the second electrical insulator includes a dielectric paper.

A system includes: a load; a variable speed drive; and the shield device, where the shield device is connected between the load and the variable speed drive.

In further features, centers of the first and second shield connectors are offset from a vertical centerline of the shield device.

In further features, centers of the first and second shield connectors are located on a vertical centerline of the shield device.

In further features, the shield device further includes a clamping device configured to clamp an electrical insulator that surrounds the second shield of the second section of the shielded cable.

In further features, the shielded cable satisfies the 2018 edition of the National Fire and Protection Association (NFPA) 79 electrical standard for industrial machinery.

In a feature, a shield device includes: an electrical conductor; an electrical insulator that is configured to electrically isolate the electrical conductor from a DIN rail and to hang the shield device from the DIN rail; a first shield connector configured to: directly contact a first shield; and electrically connect the first shield with the electrical conductor; and a second shield connector configured to: directly contact at least 180 degrees of a circumference of a second shield that surrounds at least two insulated conductors of a second section of a shielded cable; and electrically connect the second shield with the electrical conductor.

In further features, the electrical conductor has uniform length, width, and thickness.

In further features, the electrical conductor is planar.

A system includes: a load; a variable speed drive; and the shield device, where the shield device is connected between the load and the variable speed drive.

In further features, the shield device further includes a clamping device configured to clamp an electrical insulator that surrounds the second shield of the second section of the shielded cable.

In further features, the first shield is a flat braid shield.

In further features, the first shield connector includes an electrically conductive fastener configured to fasten the first shield to the electrical conductor.

In further features, the fastener includes a screw.

In further features, the first shield includes a flat braid connector that is electrically connected to an end of the first shield.

In further features, the flat braid connector includes an aperture through which the fastener extends.

In further features, the shielded cable satisfies the 2018 edition of the National Fire and Protection Association (NFPA) 79 electrical standard for industrial machinery.

In a feature, a shield device includes: an electrical conductor having a first portion and a second portion; an electrical insulator that is fixed to the first portion and that is configured to electrically isolate the electrical conductor from a DIN rail and to hang the shield device from the DIN rail; a first cable gland that is engaged with the second portion of the electrical conductor and that is configured to: engage a first shield that surrounds at least two insulated conductors of a first section of a shielded cable; and electrically connect the first shield with the electrical conductor; and a second cable gland that is engaged with the second portion of the electrical conductor and that is configured to: engage a second shield that surrounds at least two insulated conductors of a second section of the shielded cable; and electrically connect the second shield with the electrical conductor.

In further features, the second portion is perpendicular to the first portion.

In further features: the first cable gland is coupled to a first circular aperture in the second portion of the electrical conductor; and the second cable gland is coupled to a second circular aperture in the second portion of the electrical conductor.

In further features, the electrical conductor is made of aluminum.

A system includes: a load; a variable speed drive; and the shield device, where the shield device is connected between the load and the variable speed drive.

In further features, the shield device further includes a clamping device configured to clamp a first electrical insulator that surrounds the first shield of the first section of the shielded cable.

In further features, the clamping device is further configured to clamp a second electrical insulator that surrounds the second shield of the second section of the shielded cable.

In further features, the shielded cable satisfies the 2018 edition of the National Fire and Protection Association (NFPA) 79 electrical standard for industrial machinery.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of a variable speed drive (VSD) powering a load;

FIGS. 2-4 are functional block diagrams of example implementations of the VSD where the load is an electric motor;

FIG. 8 is a side view of an example implementation of the shield device of FIG. 7A;

FIG. 9 is a front view of the example implementation of the shield device of FIG. 7A;

FIG. 16 is a side view of an example implementation of the shield device of FIG. 14;

FIG. 17 is a front view of the example implementation of the shield device of FIG. 14;

FIG. 20 is a front view of an example of the shield devices of FIGS. 8-19 with an insulator clamp;

FIG. 21 is a rear view of the example of the shield devices of FIGS. 8-19 with an insulator clamp;

FIG. 29 includes a front view of an example of the shield devices of FIGS. 24-28 with an insulator clamp;

FIG. 30 includes a side view of the example of the shield devices 700 of FIGS. 24-28 with the insulator clamp;

FIG. 31 is a side view of an example implementation of the shield device of FIG. 7A;

In the drawings, reference numbers may be reused to identify similar and/or identical elements.

DETAILED DESCRIPTION

Figure 4:
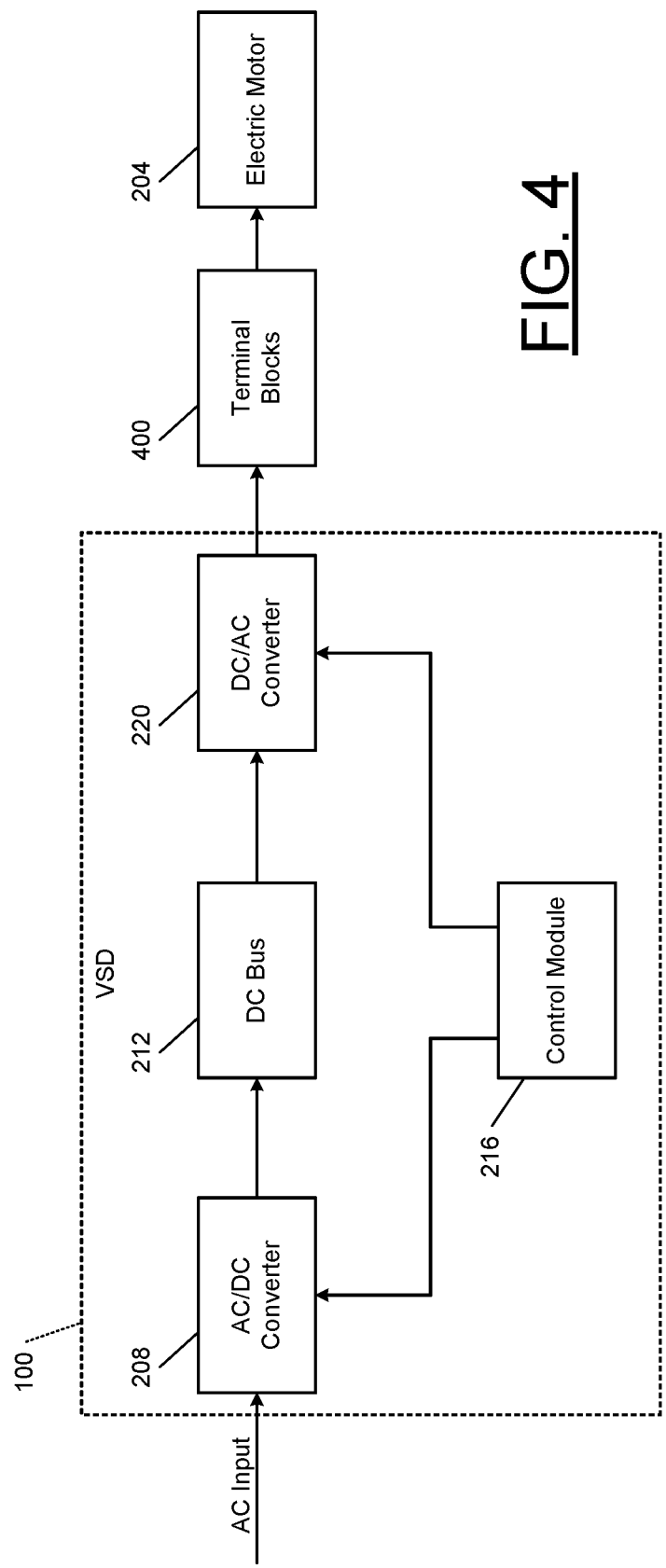

Variable speed drives can be used to control speed and torque of an electric motor. VSDs may include semiconductors that use insulated gate bipolar transistors (IGBTs) that switch and control power output to the electric motor because IGBTs may allow for higher carrier and/or switching frequencies. Higher carrier and/or switching frequencies may decrease current ripple and allow for better performance of torque in electric motors, such as at lower speeds and/or operating frequencies. This may increase process performance.

Higher carrier frequencies also reduce electric motor lamination noise and decrease motor sound production. Decreased sound production may be valuable in various different industries, such as theaters and hospitals. Higher carrier frequencies also allow for less harmonic heating in the motor, which results in increased motor longevity and reliability.

Faster switching IGBTs, however, may increase noise frequencies. Noise may increase as IGBT switching increases. The value of increasing the carrier frequency, which determines the repetition rate of these noise currents being coupled to ground, may be worse for installations that must break/cut and re-terminate any shielded output cables connected between an electric motor and a VSD.

The NFPA 79 standard, 2018 edition, mandates the use of shielded cable between VSDs and motors. Some installations require that the shielded cable be broken/cut and re-terminated between VSD and motor, for example, to shut off power to motor and/or perform maintenance on motors without having to shut off the VSDs. Some industries may not shut off power to main control panels (including VSDs) and communications to networked systems as they may lose production.

Installations may be incorrect to manage the noise frequencies. Noise may be worsened if the shielded cable is broken/cut and re-terminated with the high frequency common mode noise (carried on the shield) is coupled to lower frequency 50/60 Hz circuits. Common mode noise is a type of electrical noise that is induced on signals with respect to referenced ground. This is a source of noise that is coupled by conduction or radiation, and circuits and sensitive equipment are susceptible to the magnitude, frequency, and repetition rate (carrier) of common mode noise.

Without isolating high frequency currents from a motor with the shielded cable being broke/cut and re-terminated, noise issues may dictate that the VSD be controlled at lower carrier and switching frequencies, thus not taking advantage of the abilities of the IGBTs. Using lower frequencies in this setting reduces the repetition rate of the noise created. The present application involves shield devices that isolate the shields from the lower frequency circuitry.

Capacitive stray coupling of common mode noise may be problematic. For example, noise cause metal detecting machinery to be unable to detect metal in products, such as food. Circuits can also store high frequency currents, increasing a possibility of current build up/shorts. Also, mixing the high frequency common mode current with lower 50/60 Hz frequency equipment may not be desirable.

In grounding systems that are solid ground (XO on transformer ground), transient noise currents complete a path in the system and an antenna is formed. Training the noise to not affect equipment/personnel may be desirable.

The present application involves shield devices that enable the shielded cable to be broken/cut and re-terminated between VSDs and motors. The shield devices include shield connectors configured to electrically couple to the shield portion of the shield cables. The shield device also includes an electrical conductor that is electrically connected to the shield connectors such that the shields of the shield cables are electrically connected via the shield device. The shield device also includes an electrical isolator, such as a DIN rail connector, that electrically isolates the shields from other electrical components.

FIG. 1 is a functional block diagram of an example implementation including a variable speed drive (VSD) 100 powering a load 104. VSDs can also be referred to as adjustable speed drives (ASDs). While the example of a variable speed drive is discussed, the present application is also applicable to other types of drives, such as variable frequency drives.

The VSD 100 receives alternating current (AC) input power, such as three phase AC input power. Based on the AC input power, the VSD 100 outputs power to the (electrical) load 104. For example, the VSD 100 may output three-phase AC power to the load 104. Other types of VSDs output direct current (DC) power to the load 104.

FIG. 2 is a functional block diagram of an example implementation of the VSD 100 where the load 104 is an electric motor 204. While the example of the load 104 being the electric motor 204 will be discussed, the present application is also applicable to other types of loads.

The VSD 100 may include an AC/DC converter 208 that converts the AC input power to direct current (DC) power and outputs a DC voltage to a DC bus 212. The AC/DC converter 208 may be a passive AC/DC converter, such as a rectifier (e.g., full-wave). In various implementations, the AC/DC converter 208 may be an active converter or include one or more active components, such as for a buck converter, a boost converter, or a combination buck/boost converter. In the example of the AC/DC converter 208 including one or more active components or being an active converter, a control module 216 may control switching of the AC/DC converter 208. The DC bus 212 may include, for example, one or more capacitors and/or one or more other components.

A DC/AC converter 220 converts DC power from the DC bus 212 into AC power and outputs the AC power to the electric motor 204. The DC/AC converter 220 may be, for example, an inverter (e.g., a three-phase inverter) or another suitable type of DC/AC converter. The control module 216 controls switching of the DC/AC converter 220 to control the AC power output to the electric motor 204, such as voltage, current, phase angle(s), and other characteristics of the AC power output.

FIG. 3 is also a functional block diagram of the example implementation of the VSD 100 where the load 104 is the electric motor 204. As shown in FIG. 3, in various implementations, a disconnect 300 may be electrically connected between the VSD 100 and the electric motor 204. The disconnect 300 may be a manual disconnect or an automatic disconnect. The disconnect 300 electrically disconnects the electric motor 204 from the VSD 100 when the disconnect 300 is open. The disconnect 300 electrically connects the electric motor 204 with the VSD 100 when the disconnect 300 is closed. In addition to connecting and disconnecting the VSD 100 and the electric motor 204, the disconnect 300 may allow for one or more measurements to be taken (e.g., via a probe) between the VSD 100 and the electric motor 204.

FIG. 4 is also a functional block diagram of the example implementation of the VSD 100 where the load 104 is the electric motor 204. As shown in FIG. 4, in various implementations, terminal blocks 400 may be electrically connected between the VSD 100 and the electric motor 204. The terminal blocks 400 may allow for one or more measurements to be taken (e.g., via a probe) between the VSD 100 and the electric motor 204.

Referring to FIGS. 3 and 4, the VSD 100 receives the AC input power by wire. The VSD 100 outputs power to the electric motor 204 by wire, such as via a shielded cable. The shielded cable may include cross-linked polyethylene (XLPE). The shielded cable satisfies the National Fire and Protection Association (NFPA) 79 electrical standard for industrial machinery. The NFPA 79 standard may be the 2018 edition or a later edition. The shielded cable may include, for example, one insulated ground conductor, three insulated reference conductors (e.g., U, V, W, or A, B, C), a shield (e.g., braided) that surrounds the ground and reference conductors, and an external insulator that surrounds the shield. In various implementations, more than one shielded cable may be connected per phase, for example, for higher horsepower electric motors.

Figure 5:
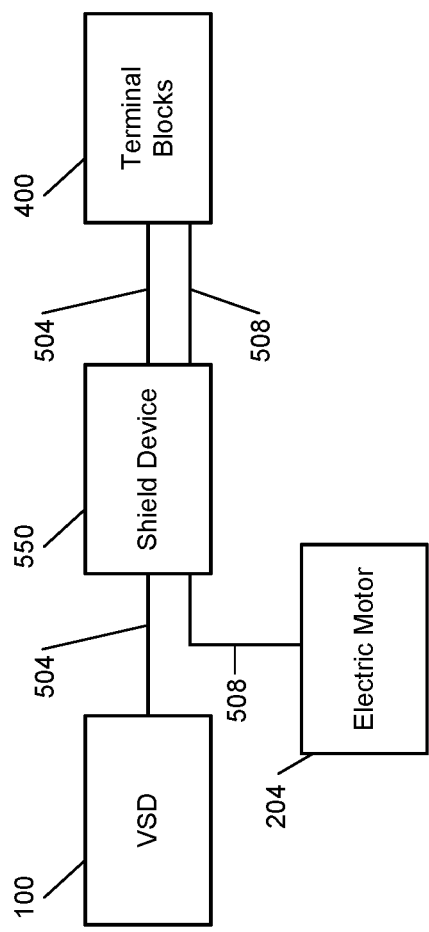
FIG. 5 includes a functional block diagram where terminal blocks are connected between the VSD and the electric motor.

FIG. 5 includes a functional block diagram illustrative of the example of FIG. 4 where the terminal blocks 400 are connected between the VSD 100 and the electric motor 204. A first length (portion) 504 of the shielded cable is electrically connected between respective output terminals of the VSD 100 and first terminals of respective ones of the terminal blocks 400. A second length (portion) 508 of the shielded cable is electrically connected between second terminals of the respective ones of the terminal blocks 400 and respective terminals of the electric motor 204. Each of the terminal blocks 400 has its first terminal internally electrically connected to its second terminal. As discussed further below, the terminal blocks 400 may be hung from a DIN rail.

A shield device 550 includes an electrical conductor to which the shields of the first and second lengths 504 and 508 are electrically connected. The shield device 550 also includes an electrical insulator that electrically isolates/insulates the conductor of the shield device 550 (and therefore the shields of the shielded cable) from the DIN rail and any other components that are electrically connected to the DIN rail. The shield device 550 isolates the high frequency noise carried on the shields of the first and second lengths 504 and 508 of the shielded cable from other components and other noise (e.g., low frequency noise).

Figure 6:
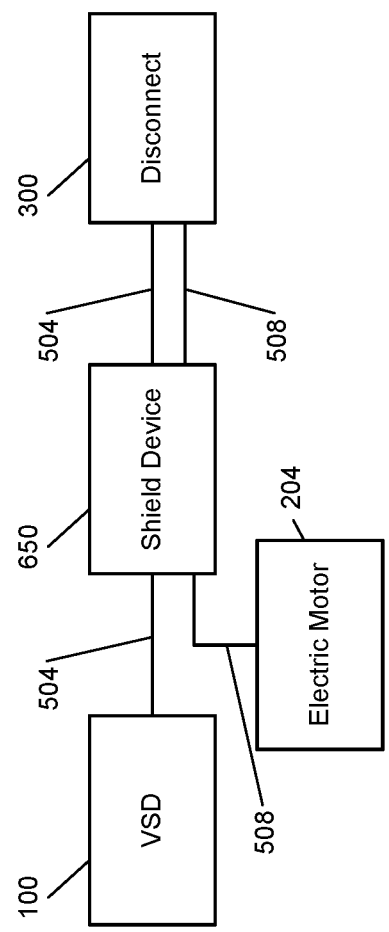
FIG. 6 includes a functional block diagram where a disconnect is electrically connected between the VSD and the electric motor.

FIG. 6 includes a functional block diagram illustrative of the example of FIG. 3 where the disconnect 300 is electrically connected between the VSD 100 and the electric motor 204. In this example, the first length 504 of the shielded cable is electrically connected between respective output terminals of the VSD 100 and respective first terminals of the disconnect 300. The second length 508 of the shielded cable is electrically connected between respective second terminals of the disconnect 300 and respective terminals of the electric motor 204.

As discussed further below, the shields of the first and second lengths 504 and 508 of the shielded cable are electrically connected to each other via an electrical conductor of a shield device 650. The shield of the first length 504 and the shield of the second length 508 are not electrically connected to the disconnect 300. The shield device 650 isolates the high frequency noise carried on the shields of the first and second lengths 504 and 508 of the shielded cable from other components and other noise (e.g., low frequency noise).

Figure 7A:
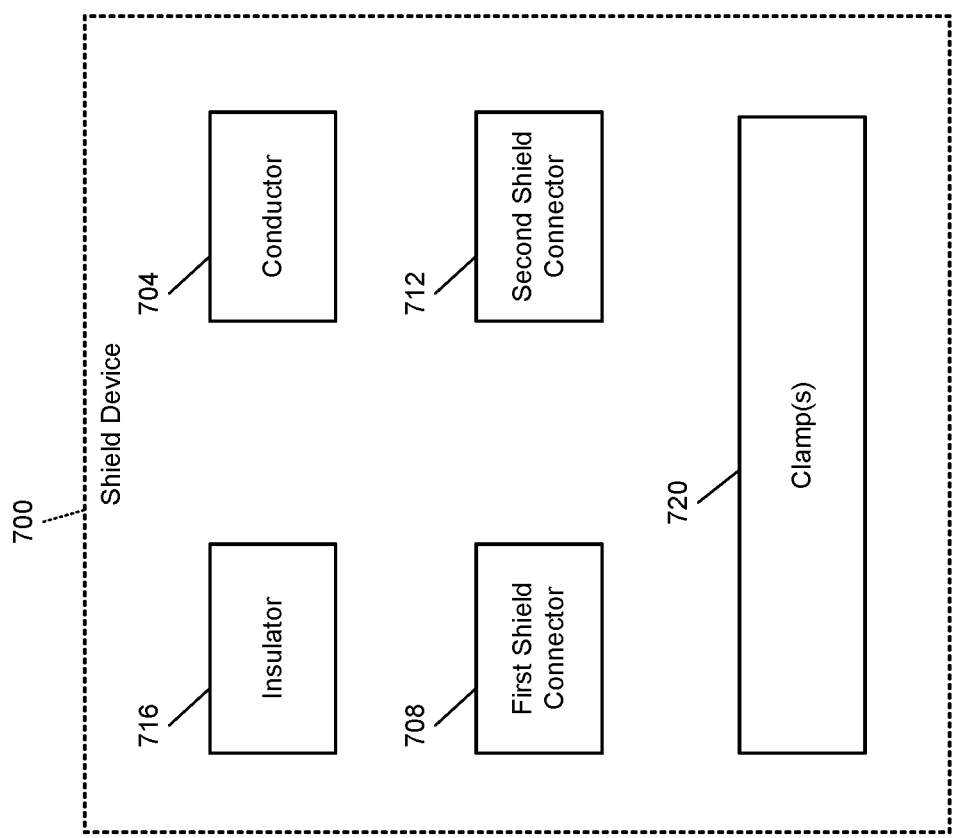
FIGS. 7A and 7B include a functional block diagram of an example implementation of a shield device.

FIG. 7A includes a functional block diagram of an example implementation of a shield device 700, such as the shield device 550 and the shield device 650. The shield device 700 includes an electrical conductor 704, a first shield connector 708, and a second shield connector 712. Examples of the first and second shield connectors 708 and 712 are illustrated.

The first and second shield connectors 708 and 712 are electrically connected to the electrical conductor 704 and are configured to electrically connect to the shield of the shielded cable radially around the shielded cable. Examples of the electrical conductor 704 are illustrated.

The shield device 700 also includes an electrical insulator 716 that electrically isolates the electrical conductor 704 from other electrically conductive components. The electrical insulator 716 may include, for example, DIN rail connectors that are configured to couple (and hang) the shield device 700 from a DIN rail. The shield device 700 may also include one or more other electrical insulators, as discussed further below.

In various implementations, the shield device 700 may also include one or more (insulator) clamps 720 (clamping devices). The clamp(s) 720 may be used to grasp (clamp) the outer electrical insulator around one or more of the lengths of the shielded cable. The clamp(s) 720 may, for example, help prevent disconnection of the lengths of the shielded cable, for example, if weight is applied to the lengths of the shielded cable. In one example, the clamps 720 may include insulated cable tie strain reliefs.

Figure 7B:
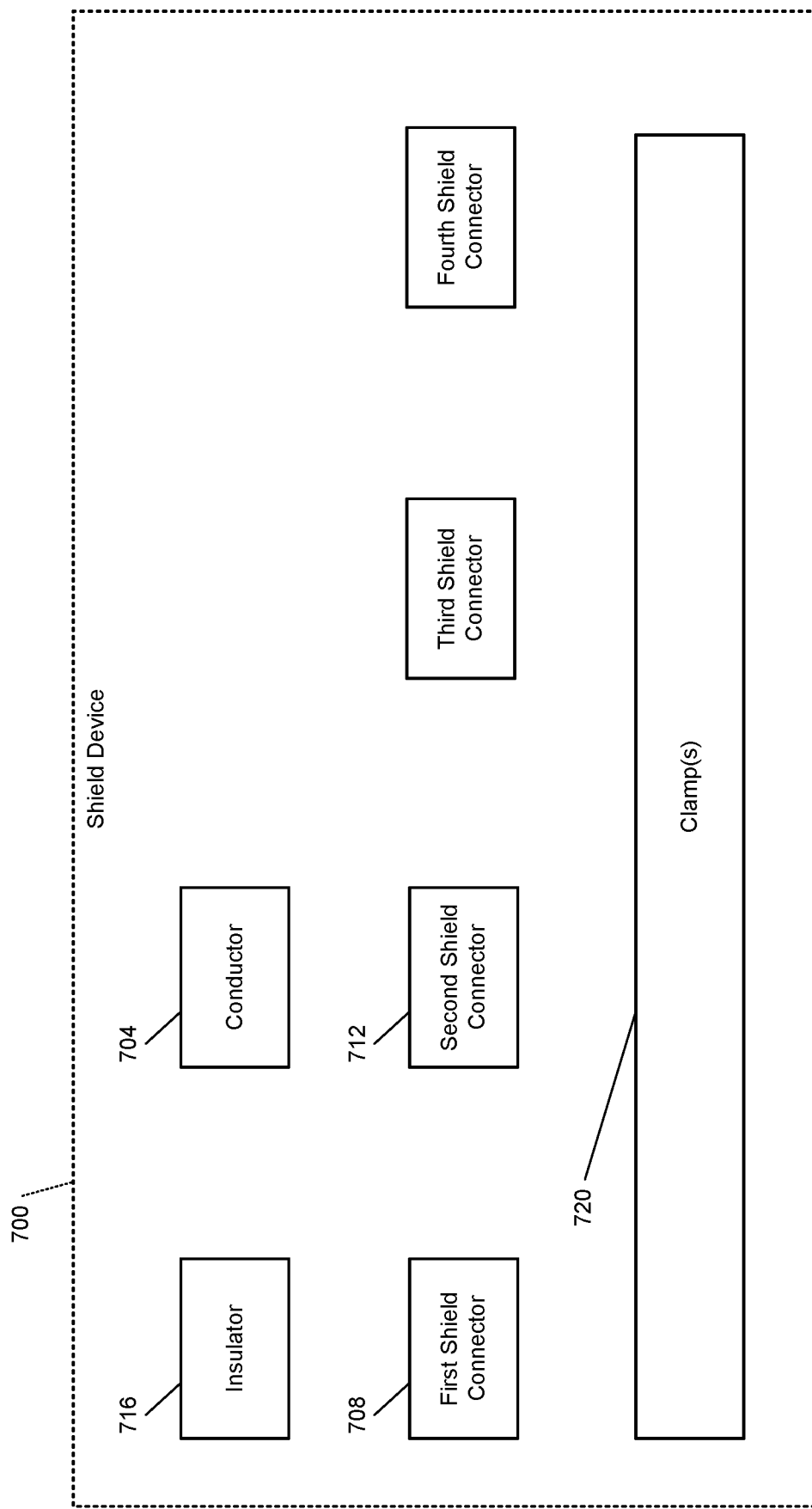

In the example of more than one shielded cable being connected per phase, for example, for higher horse power electric motors, the shield device 700 include a set of two shield connectors per shielded cable. For example, if two shielded cables are connected per phase of an electric motor, the shield device 700 may include 4 shield connectors, as illustrated in FIG. 7B.

Figure 10:
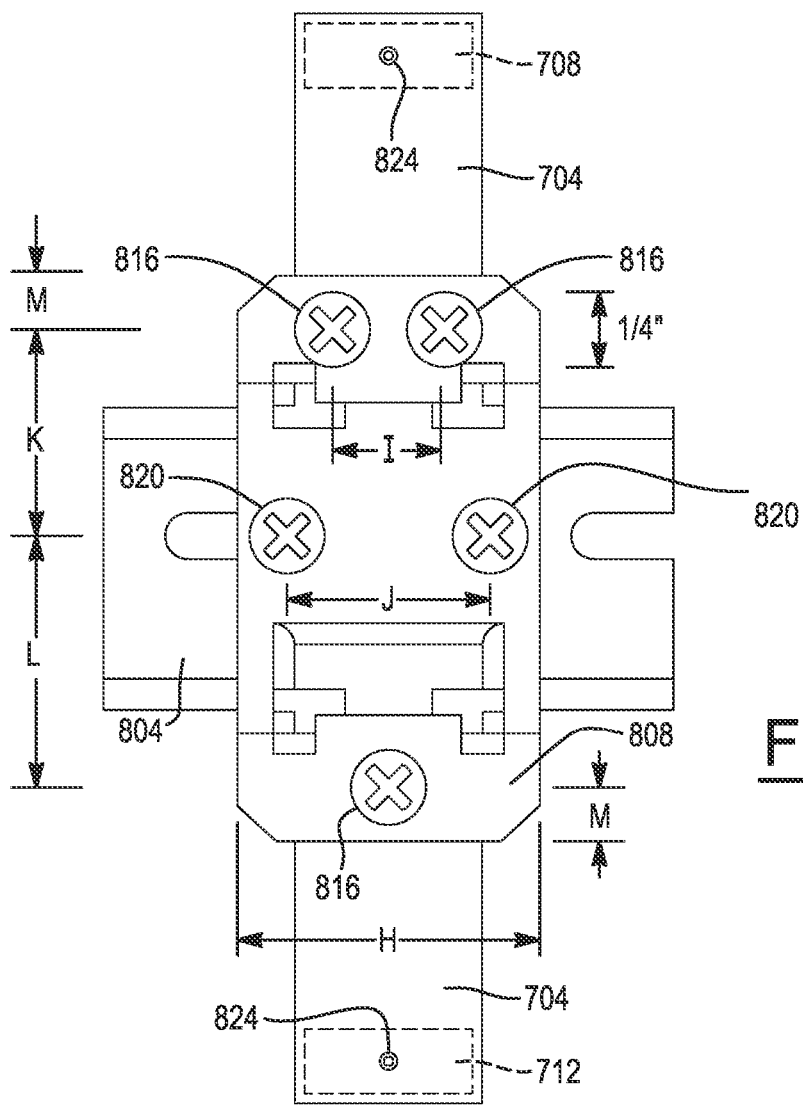
FIG. 10 is a rear view of the example implementation of the shield device of FIG. 7A.
Figure 11:
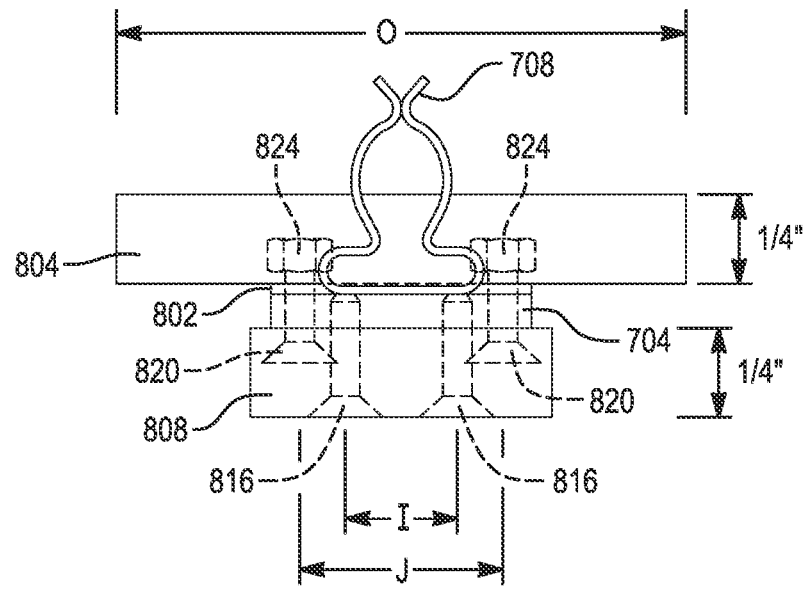
FIG. 11 is a top view of the example implementation of the shield device of FIG. 7A.

FIG. 8 is a side view of an example implementation of the shield device 700. FIG. 9 is a front view of the example implementation of the shield device 700 of FIG. 7A. FIG. 10 is a rear view of the example implementation of the shield device 700 of FIG. 7A. FIG. 11 is a top view of the example implementation of the shield device 700 of FIG. 7A.

Referring to FIGS. 8-11, the shield device 700 includes the first shield connector 708, the second shield connector 712, and the electrical conductor 704. The shield device 700 also includes an electrical insulator 802. The electrical insulator 802 may include, for example, a dielectric sheet (e.g., paper), such as ITW Formex dielectric paper. The electrical insulator 802 electrically isolates the electrical conductor 704 from a DIN rail 804. The DIN rail 804 may be, for example, a 15 millimeter (mm) DIN rail, a 35 mm DIN rail, or another suitable type of DIN rail.

The electrical conductor 704 may be, for example, an aluminum bar or another suitable type of electrical conductor and/or material (e.g., copper, steel, etc.). The electrical conductor 704 may be planar and have a uniform width, length, and thickness.

The shield device 700 also includes a DIN rail connector 808. The DIN rail connector 808 serves as the electrical insulator 716. The DIN rail connector 808 is configured to couple (and hang) the shield device 700 to a second DIN rail. The second DIN rail may be, for example, a 15 mm DIN rail, a 35 mm DIN rail, or another suitable type of DIN rail. The DIN rail connector 808 has one or more features 812 configured to hold the shield device 700 to the second DIN rail. The DIN rail connector 808 is also releasable from the second DIN rai. The DIN rail connector 808 is an electrical insulator and may be made of, for example, a dielectric material or another suitable type of electrically insulative/isolative material. The DIN rail connector 808 electrically isolates the electrical conductor 704 from the second DIN rail and any other components that are electrically connected to the second DIN rail.

The DIN rail connector 808 may be fixed to the electrical conductor 704 via one or more fasteners, such as screws 816. In various implementations, the DIN rail connector 808 may be fixed to the electrical conductor 704 in another suitable manner, such as via an adhesive or via one or more other types of fasteners. In an example, the screws 816 may be #8-32×⅜" screws. The holes for the screws through the electrical conductor 704 may be countersunk.

The DIN rail 804 may be fixed via one or more fasteners, such as screws 820 and nuts 824. This may sandwich the electrical insulator 802 directly between the DIN rail 804 and the electrical conductor 704. In various implementations, the DIN rail 804 may be fixed to the electrical insulator 802, and the electrical insulator 802 may be fixed to the electrical conductor 704 in another suitable manner, such as via an adhesive or via one or more other types of (e.g., non-conductive) fasteners. In an example, the screws 820 may be #8-32×½" screws. The holes for the screws 820 may be countersunk.

The first and second shield connectors 708 and 712 are electrically conductive and are electrically connected to the electrical conductor 704. The first and second shield connectors 708 and 712 may be fixed to the electrical conductor 704 via one or more fasteners, such as screws or rivets 824. In various implementations, the first and second shield connectors 708 and 712 may be fixed to the electrical conductor 704 in another suitable manner, such as via an electrically conductive adhesive or via one or more other types of fasteners. In this example, the first and second shield connectors 708 and 712 are shield clamps.

The first and second shield connectors 708 and 712 are configured to electrically contact (and directly contact) as much of the 360 degree surface area of the shield portion (once exposed) of the first and second lengths 504 and 508 of the shielded cable as possible. The first and second shield connectors 708 and 712 may electrically contact at least 180 degrees of a circumference of the shield portion, at least 210 degrees of the circumference, at least 240 degrees of the circumference, at least 270 degrees of the circumference, or at least 300 degrees of the circumference. The first and second shield connectors 708 and 712 may be, for example, metal cable clamps, such as EMC shield clamps by Icotek or another suitable type of electrically conductive shield clamp.

The terminal blocks 400 are configured to securely hold to the DIN rail 804. The first and second lengths 504 and 508 of the shielded cable can be connected to the terminal blocks 400 as described above.

Example dimensions for the example of FIGS. 7-11 are as follows for different motors having different horsepower (HP) ratings.

| HP | A | B | C | D | E | F | G | H | I |
|---|---|---|---|---|---|---|---|---|---|
| 1 | 0.75 | 2.50 | 2.50 | 6.375 | 0.551 | 0.315 | 0.787 | 1.3780 | 0.5625 |
| 2 | 0.75 | 2.50 | 2.50 | 6.375 | 0.551 | 0.315 | 0.787 | 1.3780 | 0.5625 |
| 3 | 0.75 | 2.50 | 2.50 | 6.375 | 0.551 | 0.315 | 0.787 | 1.3780 | 0.5625 |
| 5 | 0.75 | 2.50 | 2.50 | 6.375 | 0.551 | 0.315 | 0.787 | 1.3780 | 0.5625 |
| 10 | 0.75 | 2.50 | 2.50 | 6.375 | 0.551 | 0.315 | 0.787 | 1.3780 | 0.5625 |
| 15 | 0.75 | 2.50 | 2.50 | 6.375 | 0.827 | 0.315 | 1.083 | 1.3780 | 0.5625 |
| 20 | 1.50 | 2.50 | 2.50 | 6.375 | 0.827 | 0.315 | 1.083 | 1.8898 | 1.125 |
| 25 | 1.50 | 2.50 | 2.50 | 6.375 | 0.827 | 0.315 | 1.083 | 1.8898 | 1.125 |
| 30 | 1.50 | 3.00 | 3.00 | 7.375 | 0.827 | 0.315 | 1.083 | 1.8898 | 1.125 |
| 40 | 1.50 | 3.00 | 3.00 | 7.375 | 1.043 | 0.315 | 1.358 | 1.8898 | 1.125 |
| 50 | 2.50 | 3.50 | 3.50 | 8.375 | 1.378 | 0.315 | 1.555 | 4.0000 | 2.125 |
| 60 | 2.50 | 4.00 | 4.00 | 9.375 | 1.378 | 0.315 | 1.555 | 4.0000 | 2.125 |
| 75 | 2.50 | 4.00 | 4.00 | 9.375 | 1.378 | 0.315 | 1.555 | 4.0000 | 2.125 |
| 100 | 2.50 | 4.50 | 4.50 | 10.375 | 1.902 | 0.433 | 2.154 | 4.0000 | 2.125 |
| 125 | 2.50 | 5.00 | 5.00 | 11.375 | 1.902 | 0.433 | 2.154 | 4.0000 | 2.125 |
| 150 | 2.50 | 5.50 | 5.50 | 12.375 | 1.902 | 0.433 | 2.154 | 4.0000 | 2.125 |
| 200 | 2.50 | 6.00 | 6.00 | 13.375 | 2.165 | 0.512 | 2.638 | 4.0000 | 2.125 |

| HP | J | K | L | M | N | O |
|---|---|---|---|---|---|---|
| 1 | 0.9375 | 1.000 | 1.250 | 0.1875 | 2.625 | 1.4331 |
| 2 | 0.9375 | 1.000 | 1.250 | 0.1875 | 2.625 | 1.4331 |
| 3 | 0.9375 | 1.000 | 1.250 | 0.1875 | 2.625 | 1.4331 |
| 5 | 0.9375 | 1.000 | 1.250 | 0.1875 | 2.625 | 1.5906 |
| 10 | 0.9375 | 1.000 | 1.250 | 0.1875 | 2.625 | 1.5906 |
| 15 | 0.9375 | 1.000 | 1.250 | 0.1875 | 2.625 | 1.5906 |
| 20 | 1.500 | 1.000 | 1.250 | 0.1875 | 2.625 | 1.9055 |
| 25 | 1.500 | 1.000 | 1.250 | 0.1875 | 2.625 | 1.9055 |
| 30 | 1.500 | 1.000 | 1.250 | 0.1875 | 2.625 | 2.1890 |
| 40 | 1.500 | 1.000 | 1.250 | 0.1875 | 2.625 | 2.8504 |
| 50 | 3.000 | 1.750 | 1.500 | 0.3750 | 4.000 | 3.4646 |
| 60 | 3.000 | 1.750 | 1.500 | 0.3750 | 4.000 | 3.4646 |
| 75 | 3.000 | 1.750 | 1.500 | 0.3750 | 4.000 | 3.4646 |
| 100 | 3.000 | 1.750 | 1.500 | 0.3750 | 4.000 | 5.3307 |
| 125 | 3.000 | 1.750 | 1.500 | 0.3750 | 4.000 | 7.3386 |
| 150 | 3.000 | 1.750 | 1.500 | 0.3750 | 4.000 | 7.3386 |
| 200 | 3.000 | 1.750 | 1.500 | 0.3750 | 4.000 | 7.3386 |

Figure 12:
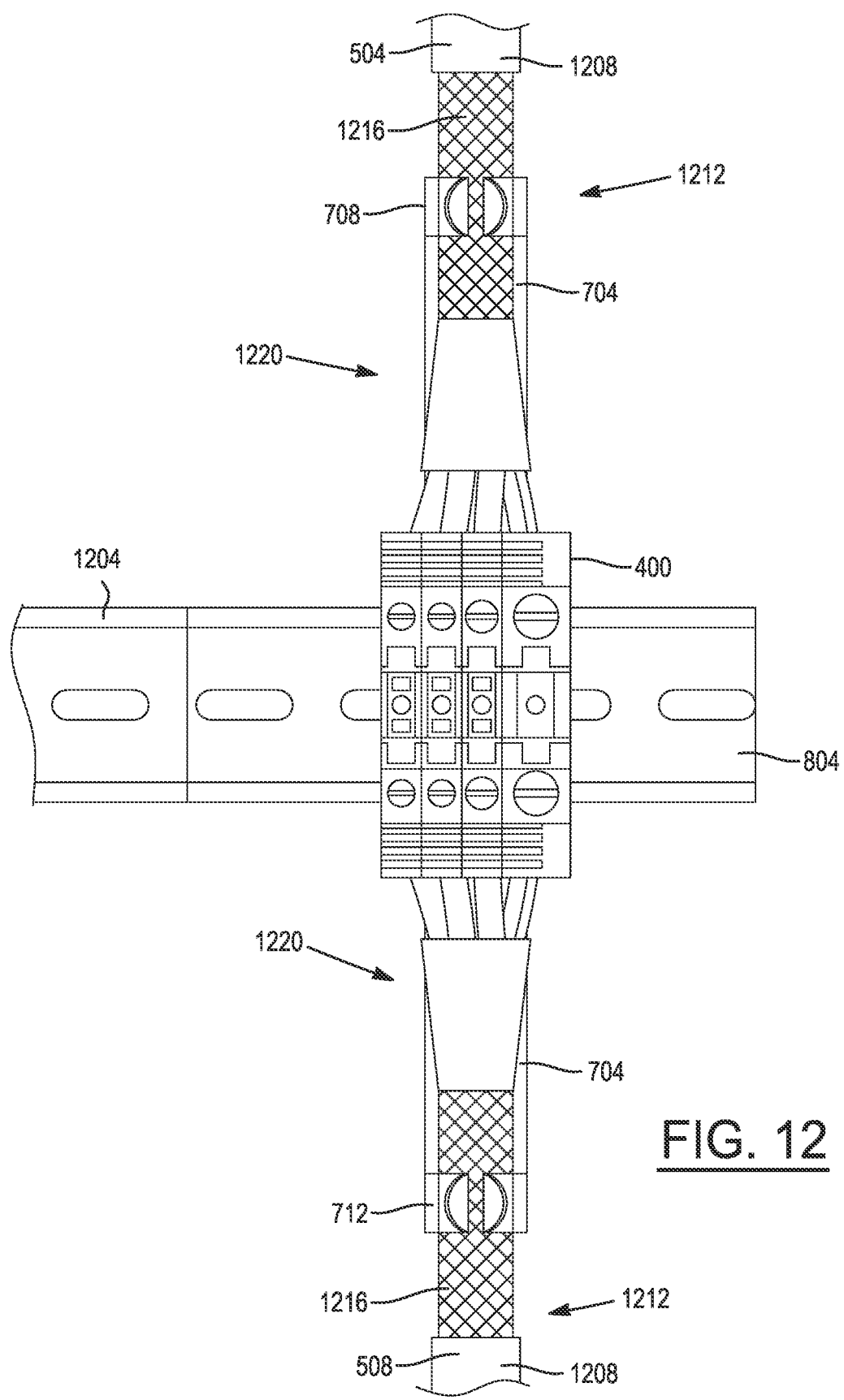
FIG. 12 is an example illustration of the shield device mounted to a second DIN rail with examples of terminal blocks mounted to a first DIN rail.
Figure 13:
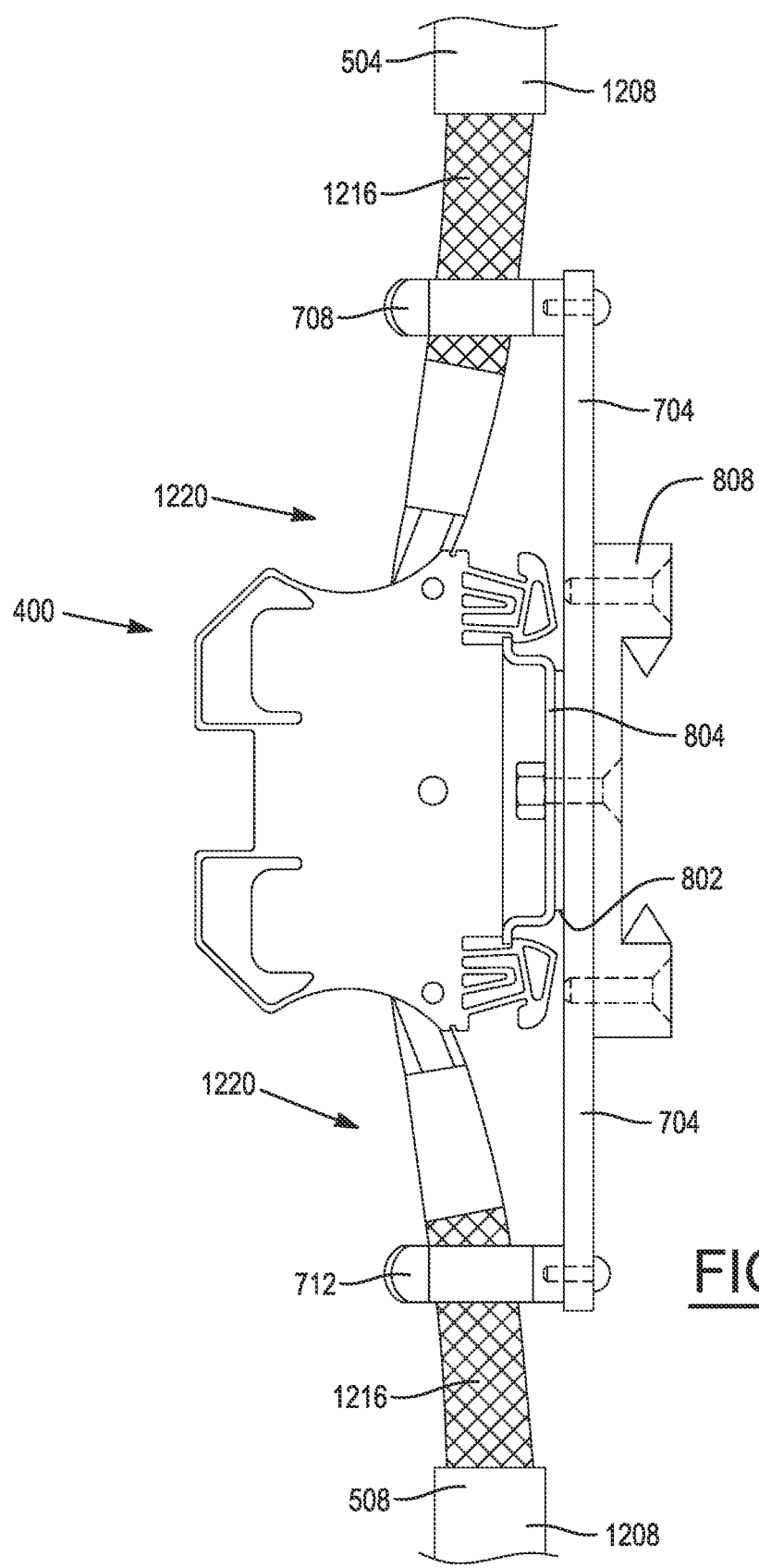
FIG. 13 is a cross-sectional view of the shield device of FIG. 12.

FIG. 12 includes an example image of the shield device 700 mounted to a second DIN rail 1204 with examples of the terminal blocks 400 mounted to the DIN rail 804. FIG. 13 is a cross-sectional view of the shield device 700 of FIG. 12. In various implementations, one or more of the terminal blocks 400 may be replaced with one or more contactors.

As shown in FIGS. 12 and 13, the (outer) insulator 1208 is stripped from ends 1212 of the first and second lengths 504 and 508 of the shielded cable to expose shields 1216 (e.g., braided) of the first and second lengths 504 and 508 of the shielded cable. The shields 1216 encircle insulated conductors 1220 (the reference conductors and the ground conductor) of the first and second lengths 504 and 508 of the shielded cable. Ends of the insulated conductors 1220 are stripped of the insulation and connected to the terminal blocks 400, respectively.

Figure 14:
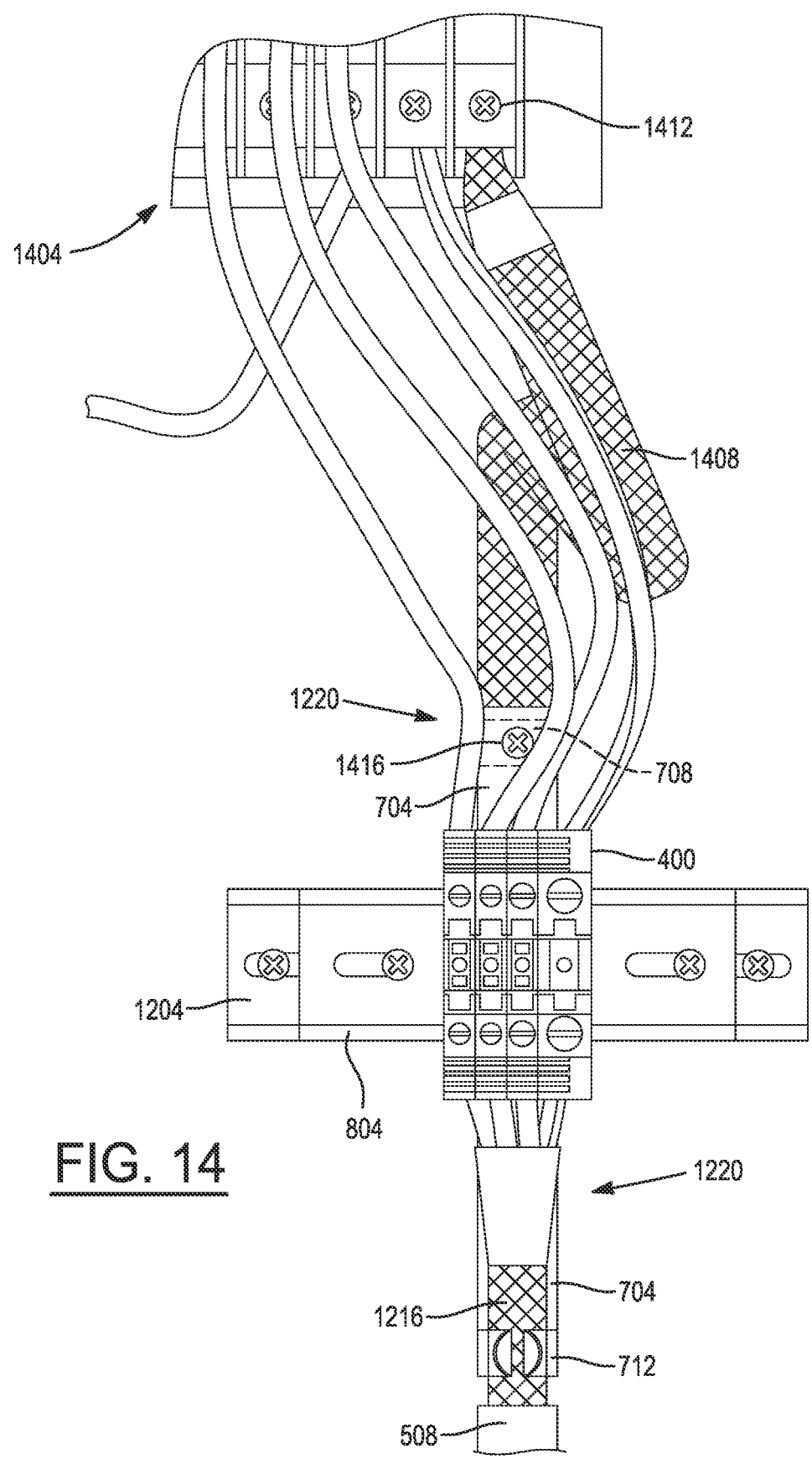
FIG. 14 is an example front view of the shield device of FIG. 7A.

FIG. 14 is an example front view of the shield device 700 with another type of the first shield connector 708. In various implementations, the shield 1216 and the insulator 1208 may be stripped from the first length 504 of the shielded cable, and the insulated conductors 1220 may be connected between the VSD 100 and the terminal blocks 400. In such implementations, the insulated conductors 1220 of the first length 504 of the shielded cable are connected at a first end to output terminals 1404 of the VSD 100 and at second ends to the first terminals of the terminal blocks 400.

A shield conductor 1408 is connected at a first end to a shield output terminal 1412 of the VSD 100 and at a second end to the electrical conductor 704 via the first shield connector 708. In this example, the shield conductor 1408 may be a flat braid conductor (e.g., by Alpha Wire), and the first shield connector 708 may include a fastener, such as a screw 1416, configured to connect a flat braid connector that is connected to the flat braid conductor to the electrical conductor 704. In various implementations, the first shield connector 708 may be transition or interference fit onto the end of the electrical conductor 704.

Figure 15:
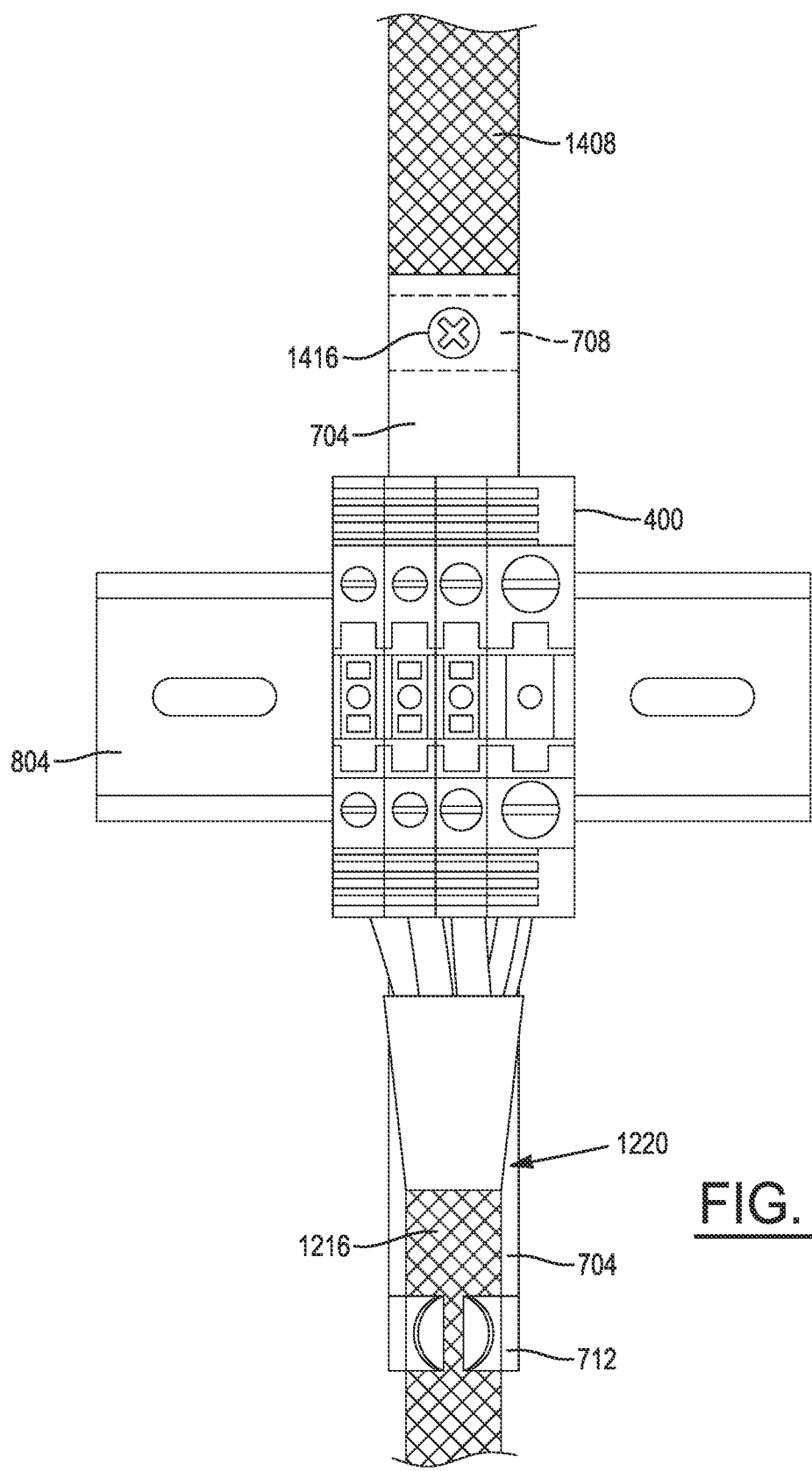
FIG. 15 includes a front view of the shield device of FIG. 14.
Figure 18:
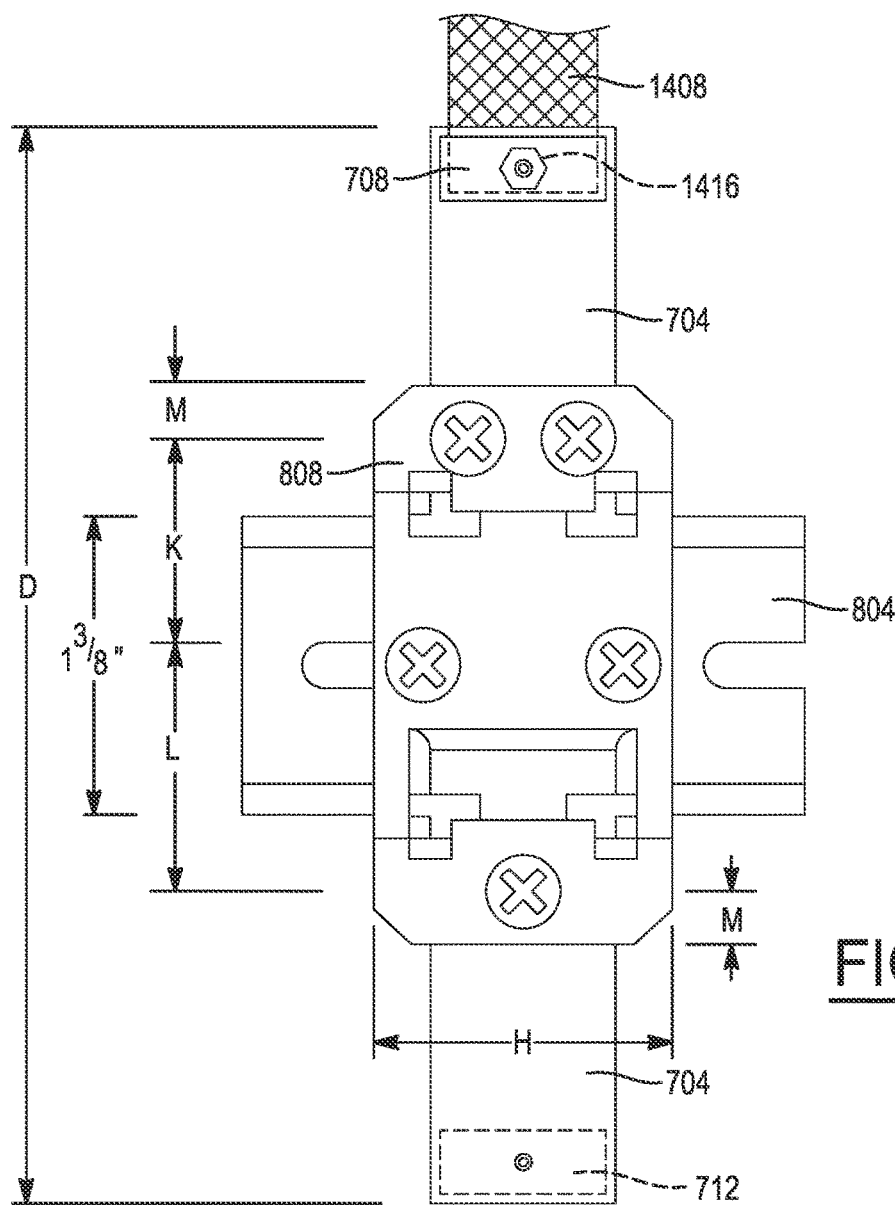
FIG. 18 is a rear view of the example implementation of the shield device of FIG. 14.
Figure 19:
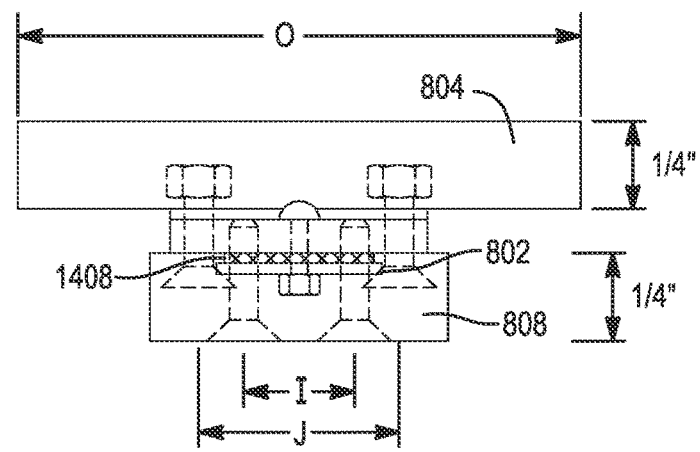
FIG. 19 is a top view of the example implementation of the shield device of FIG. 14.

FIG. 15 includes a front view of the shield device 700 of FIG. 14 without the insulated conductors 1220. FIG. 16 is a side view of an example implementation of the shield device 700. FIG. 17 is a front view of the example implementation of the shield device 700 of FIG. 14. FIG. 18 is a rear view of the example implementation of the shield device 700 of FIG. 14. FIG. 19 is a top view of the example implementation of the shield device 700 of FIG. 14.

Example dimensions for the example of FIGS. 16-19 are as follows for different motors having different HP ratings.

| HP | A | B | C | D | E | F | G | H | I |
|---|---|---|---|---|---|---|---|---|---|
| 1 | 0.75 | 2.50 | 1.50 | 5.375 | 0.551 | 0.315 | 0.787 | 1.3780 | 0.5625 |
| 2 | 0.75 | 2.50 | 1.50 | 5.375 | 0.551 | 0.315 | 0.787 | 1.3780 | 0.5625 |
| 3 | 0.75 | 2.50 | 1.50 | 5.375 | 0.551 | 0.315 | 0.787 | 1.3780 | 0.5625 |
| 5 | 0.75 | 2.50 | 1.50 | 5.375 | 0.551 | 0.315 | 0.787 | 1.3780 | 0.5625 |
| 10 | 0.75 | 2.50 | 1.50 | 5.375 | 0.551 | 0.315 | 0.787 | 1.3780 | 0.5625 |
| 15 | 0.75 | 2.50 | 1.50 | 5.375 | 0.827 | 0.315 | 1.083 | 1.3780 | 0.5625 |
| 20 | 1.50 | 2.50 | 1.50 | 5.375 | 0.827 | 0.315 | 1.083 | 1.8898 | 1.125 |
| 25 | 1.50 | 2.50 | 1.50 | 5.375 | 0.827 | 0.315 | 1.083 | 1.8898 | 1.125 |
| 30 | 1.50 | 3.00 | 1.50 | 5.875 | 0.827 | 0.315 | 1.083 | 1.8898 | 1.125 |
| 40 | 1.50 | 3.00 | 1.50 | 5.875 | 1.043 | 0.315 | 1.358 | 1.8898 | 1.125 |
| 50 | 2.50 | 3.50 | 1.50 | 6.375 | 1.378 | 0.315 | 1.555 | 4.0000 | 2.125 |
| 60 | 2.50 | 4.00 | 1.50 | 6.875 | 1.378 | 0.315 | 1.555 | 4.0000 | 2.125 |
| 75 | 2.50 | 4.00 | 1.50 | 6.875 | 1.378 | 0.315 | 1.555 | 4.0000 | 2.125 |
| 100 | 2.50 | 4.50 | 1.50 | 7.375 | 1.902 | 0.433 | 2.154 | 4.0000 | 2.125 |
| 125 | 2.50 | 5.00 | 1.50 | 7.875 | 1.902 | 0.433 | 2.154 | 4.0000 | 2.125 |
| 150 | 2.50 | 5.50 | 1.50 | 8.375 | 1.902 | 0.433 | 2.154 | 4.0000 | 2.125 |
| 200 | 2.50 | 6.00 | 1.50 | 8.875 | 2.165 | 0.512 | 2.638 | 4.0000 | 2.125 |

| HP | J | K | L | M | N | O | P |
|---|---|---|---|---|---|---|---|
| 1 | 0.9375 | 1.000 | 1.250 | 0.1875 | 2.625 | 1.4331 | 0.750 |
| 2 | 0.9375 | 1.000 | 1.250 | 0.1875 | 2.625 | 1.4331 | 0.750 |
| 3 | 0.9375 | 1.000 | 1.250 | 0.1875 | 2.625 | 1.4331 | 0.750 |
| 5 | 0.9375 | 1.000 | 1.250 | 0.1875 | 2.625 | 1.5906 | 0.750 |
| 10 | 0.9375 | 1.000 | 1.250 | 0.1875 | 2.625 | 1.5906 | 0.750 |
| 15 | 0.9375 | 1.000 | 1.250 | 0.1875 | 2.625 | 1.5906 | 0.750 |
| 20 | 1.500 | 1.000 | 1.250 | 0.1875 | 2.625 | 1.9055 | 0.750 |
| 25 | 1.500 | 1.000 | 1.250 | 0.1875 | 2.625 | 1.9055 | 0.750 |
| 30 | 1.500 | 1.000 | 1.250 | 0.1875 | 2.625 | 2.1890 | 0.750 |
| 40 | 1.500 | 1.000 | 1.250 | 0.1875 | 2.625 | 2.8504 | 0.750 |
| 50 | 3.000 | 1.750 | 1.500 | 0.3750 | 4.000 | 3.4646 | 1.000 |
| 60 | 3.000 | 1.750 | 1.500 | 0.3750 | 4.000 | 3.4646 | 1.000 |
| 75 | 3.000 | 1.750 | 1.500 | 0.3750 | 4.000 | 3.4646 | 1.000 |
| 100 | 3.000 | 1.750 | 1.500 | 0.3750 | 4.000 | 5.3307 | 1.000 |
| 125 | 3.000 | 1.750 | 1.500 | 0.3750 | 4.000 | 7.3386 | 1.000 |
| 150 | 3.000 | 1.750 | 1.500 | 0.3750 | 4.000 | 7.3386 | 1.000 |
| 200 | 3.000 | 1.750 | 1.500 | 0.3750 | 4.000 | 7.3386 | 1.000 |

FIG. 20 includes a front view of an example of the shield devices 700 of FIGS. 8-19 with the one of the clamps 720. FIG. 21 includes a rear view of the example of the shield devices 700 of FIGS. 8-19 with the one of the clamps 720. In this example, the clamps 720 include insulated cable tie strain reliefs.

The clamp 720 may be configured to grasp the insulator 1208 of the shielded cable and vertically support the shielded cable. The clamp 720 may be a (electrically) non-conductive clamp. For example only, the clamp 720 may be made of a plastic. In various implementations, the clamp 720 may include a tie wrap (e.g., a zip tie) that encircles the insulator 1208 and that extends through holes 2000 in the electrical conductor 704. The clamp 720 may be manually adjustable or non-adjustable. In various implementations, only one insulator clamp may be provided with the second shield connector 712. Providing the insulator clamp may help achieve one or more certification requirements of a certification body, such as a certification requirement of Underwriters Laboratories (UL).

Example dimensions for the example of FIGS. 20-21 are as follows for different motors having different HP ratings.

| HP  | B    | V     | Q    | R    | U     | T     |
|-----|------|-------|------|------|-------|-------|
| 1   | 2.50 | 1.000 | 1.75 | 0.75 | 0.125 | 0.375 |
| 2   | 2.50 | 1.000 | 1.75 | 0.75 | 0.125 | 0.375 |
| 3   | 2.50 | 1.000 | 1.75 | 0.75 | 0.125 | 0.375 |
| 5   | 2.50 | 1.000 | 1.75 | 0.75 | 0.125 | 0.375 |
| 10  | 2.50 | 1.000 | 1.75 | 0.75 | 0.125 | 0.375 |
| 15  | 2.50 | 1.000 | 1.75 | 0.75 | 0.125 | 0.375 |
| 20  | 2.50 | 1.000 | 1.75 | 1.50 | 0.125 | 0.375 |
| 25  | 2.50 | 1.000 | 1.75 | 1.50 | 0.125 | 0.375 |
| 30  | 3.00 | 1.000 | 1.75 | 1.50 | 0.125 | 0.375 |
| 40  | 3.00 | 1.000 | 1.75 | 1.50 | 0.125 | 0.375 |
| 50  | 3.50 | 1.000 | 1.75 | 2.50 | 0.25  | 0.625 |
| 60  | 4.00 | 1.000 | 1.75 | 2.50 | 0.25  | 0.625 |
| 75  | 4.00 | 1.000 | 1.75 | 2.50 | 0.25  | 0.625 |
| 100 | 4.50 | 1.000 | 1.75 | 2.50 | 0.25  | 0.625 |
| 125 | 5.00 | 1.000 | 1.75 | 2.50 | 0.25  | 0.625 |
| 150 | 5.50 | 1.000 | 1.75 | 2.50 | 0.25  | 0.625 |
| 200 | 6.00 | 1.000 | 1.75 | 2.50 | 0.25  | 0.625 |

Figure 22:
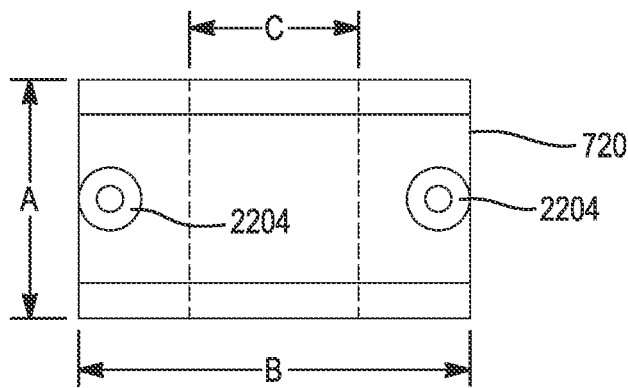
FIG. 22 is a front view of an example of an insulator clamp.
Figure 23:
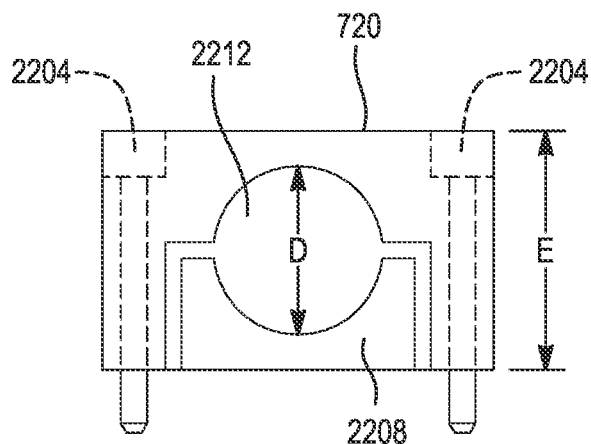
FIG. 23 includes a top view of the example of the insulator clamp of FIG. 22.

In various implementations, the clamp 720 may be separate from the shield device 700. FIG. 22 includes a front view of an example of the clamp 720 that can be provided separately from the shield device 700. FIG. 23 includes a top view of the example of the clamp 720 of FIG. 22. In the example of FIGS. 22 and 23, the clamp 720 may be mounted, for example, to an enclosure vertically below the shield device 700.

As stated above, the clamp 720 may be adjustable. For example, the clamp 720 may include one or more screws 2204 that engage threads in a portion 2208 of the clamp 720. Turning of the screw(s) 2204 adjusts dimensions of an inner aperture 2212 of the clamp 720 to retain and release the shielded cable.

Example dimensions for the example of FIGS. 22-23 are as follows for different motors having different HP ratings.

| HP | A     | B     | C     | D     | E     |
|----|-------|-------|-------|-------|-------|
| 1  | 1.000 | 0.750 | 0.509 | 0.509 | 0.750 |
| 2  | 1.000 | 0.750 | 0.509 | 0.509 | 0.750 |
| 3  | 1.000 | 0.750 | 0.509 | 0.509 | 0.750 |
| 5  | 1.000 | 0.750 | 0.582 | 0.582 | 0.750 |
| 10 | 1.000 | 0.750 | 0.582 | 0.582 | 0.750 |
| 15 | 1.000 | 0.750 | 0.656 | 0.656 | 0.750 |
| 20 | 1.000 | 1.500 | 0.707 | 0.707 | 1.500 |
| 25 | 1.000 | 1.500 | 0.807 | 0.807 | 1.500 |
| 30 | 1.000 | 1.500 | 0.807 | 0.807 | 1.500 |
| 40 | 1.000 | 1.500 | 1.022 | 1.022 | 1.500 |
| 50 | 1.000 | 2.500 | 1.158 | 1.158 | 2.500 |
| 60 | 1.000 | 2.500 | 1.332 | 1.332 | 2.500 |
| 75 | 1.000 | 2.500 | 1.332 | 1.332 | 2.500 |
| 100| 2.000 | 2.500 | 1.328 | 1.328 | 2.500 |
| 125| 2.000 | 2.500 | 1.396 | 1.396 | 2.500 |
| 150| 3.000 | 2.500 | 1.801 | 1.801 | 2.500 |
| 200| 3.000 | 2.500 | 1.996 | 1.996 | 2.500 |

Figure 24:
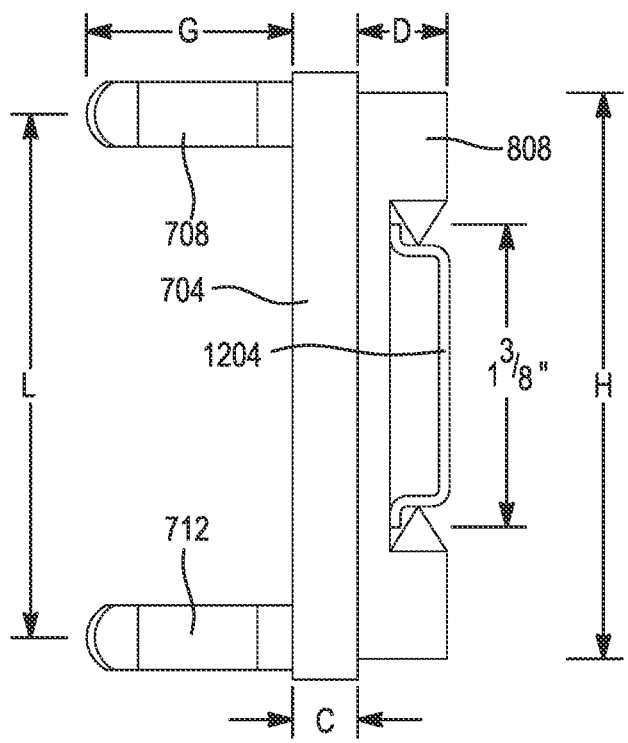
FIG. 24 is a side view of an example implementation of the shield device of FIG. 7A.
Figure 25:
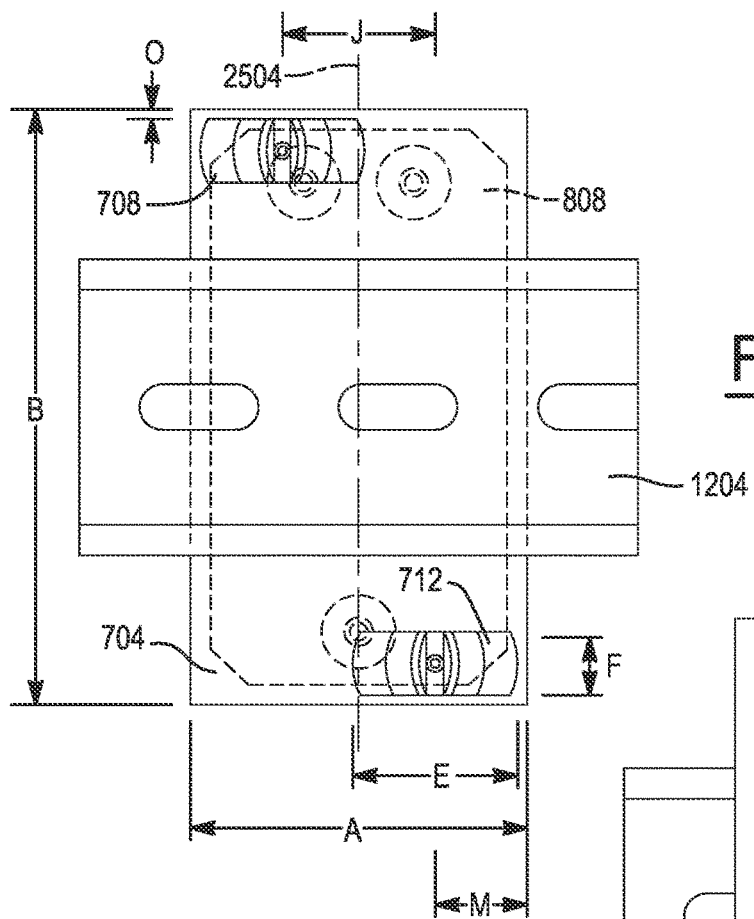
FIG. 25 is a front view of the example implementation of the shield device of FIG. 24.
Figure 26:
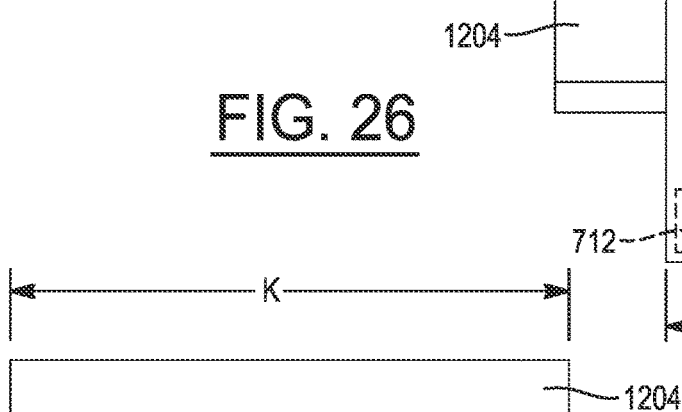
FIG. 26 is a rear view of the example implementation of the shield device of FIG. 24.
Figure 27:
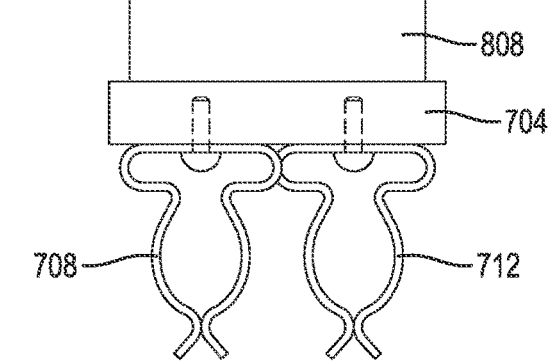
FIG. 27 is a top view of the example implementation of the shield device of FIG. 24.

In various implementations, the first and second shield connectors 708 and 712 may be offset (staggered) from each other. FIG. 24 is a side view of an example implementation of the shield device 700. FIG. 25 is a front view of the example implementation of the shield device 700 of FIG. 24. FIG. 26 is a rear view of the example implementation of the shield device 700 of FIG. 24. FIG. 27 is a top view of the example implementation of the shield device 700 of FIG. 24.

As illustrated in FIGS. 25-27, the first and second shield connectors 708 and 712 may be offset from each other. For example, as shown in FIG. 25, a center of the first shield connector 708 may be located to the left of a vertical centerline 2504 of the shield device 700 and a center of the second shield connector 712 may be to the right of the vertical centerline 2504. Alternatively, the first shield connector 708 may be located to the right of the vertical centerline 2504, and the second shield connector 712 may be located to the left of the vertical centerline 2504.

A first distance between the center of the first shield connector 708 and the vertical centerline 2504 may be equal to a second distance between the center of the second shield connector 712 and the vertical centerline 2504. In various implementations, the first and second distances may be zero such that the centers of the first and second shield connectors 708 and 712 fall on the vertical centerline 2504.

In this example, the DIN rail connector 808 serves as the electrical insulator 716 and is made of electrically insulative (non-conductive) material. The example of FIGS. 24-27 may be used with one or more of the terminal blocks 400 and/or the disconnect 300.

Example dimensions for the example of FIGS. 24-27 are as follows for different motors having different HP ratings.

| HP  | A    | B    | C    | D    | E     | F     | G     | H      | I     |
|-----|------|------|------|------|-------|-------|-------|--------|-------|
| 1   | 3.00 | 3.00 | 0.25 | 0.25 | 0.551 | 0.315 | 0.787 | 2.6250 | 1.125 |
| 2   | 3.00 | 3.00 | 0.25 | 0.25 | 0.551 | 0.315 | 0.787 | 2.6250 | 1.125 |
| 3   | 3.00 | 3.00 | 0.25 | 0.25 | 0.551 | 0.315 | 0.787 | 2.6250 | 1.125 |
| 5   | 3.00 | 3.00 | 0.25 | 0.25 | 0.551 | 0.315 | 0.787 | 2.6250 | 1.125 |
| 10  | 3.00 | 3.00 | 0.25 | 0.25 | 0.551 | 0.315 | 0.787 | 2.6250 | 1.125 |
| 15  | 3.00 | 3.00 | 0.25 | 0.25 | 0.827 | 0.315 | 1.083 | 2.6250 | 1.125 |
| 20  | 4.00 | 3.00 | 0.25 | 0.25 | 0.827 | 0.315 | 1.083 | 2.6250 | 1.125 |
| 25  | 4.00 | 3.00 | 0.25 | 0.25 | 0.827 | 0.315 | 1.083 | 2.6250 | 1.125 |
| 30  | 4.00 | 3.00 | 0.25 | 0.25 | 0.827 | 0.315 | 1.083 | 2.6250 | 1.125 |
| 40  | 4.00 | 3.00 | 0.25 | 0.25 | 1.043 | 0.315 | 1.358 | 2.6250 | 1.125 |
| 50  | 4.00 | 3.00 | 0.25 | 0.25 | 1.378 | 0.315 | 1.555 | 2.6250 | 1.125 |
| 60  | 4.00 | 3.00 | 0.25 | 0.25 | 1.378 | 0.315 | 1.555 | 2.6250 | 1.125 |
| 75  | 4.00 | 3.00 | 0.25 | 0.25 | 1.378 | 0.315 | 1.555 | 2.6250 | 1.125 |
| 100 | 6.00 | 4.00 | 0.25 | 0.25 | 1.902 | 0.433 | 2.154 | 4.0000 | 2.125 |
| 125 | 6.00 | 4.00 | 0.25 | 0.25 | 1.902 | 0.433 | 2.154 | 4.0000 | 2.125 |
| 150 | 6.00 | 4.00 | 0.25 | 0.25 | 1.902 | 0.433 | 2.154 | 4.0000 | 2.125 |
| 200 | 6.00 | 4.00 | 0.25 | 0.25 | 2.165 | 0.512 | 2.638 | 4.0000 | 2.125 |

-continued

| HP | J | K | L | M | N | O |
|---|---|---|---|---|---|---|
| 1 | 1.315 | 5.000 | 2.685 | 0.8425 | 1.890 | 0.0625 |
| 2 | 1.315 | 5.000 | 2.685 | 0.8425 | 1.890 | 0.0625 |
| 3 | 1.315 | 5.000 | 2.685 | 0.8425 | 1.890 | 0.0625 |
| 5 | 1.381 | 5.000 | 2.685 | 0.8095 | 1.890 | 0.0625 |
| 10 | 1.381 | 5.000 | 2.685 | 0.8095 | 1.890 | 0.0625 |
| 15 | 1.472 | 5.000 | 2.685 | 0.7640 | 1.890 | 0.0625 |
| 20 | 1.925 | 6.000 | 2.685 | 1.0375 | 1.890 | 0.0625 |
| 25 | 1.925 | 6.000 | 2.685 | 1.0375 | 1.890 | 0.0625 |
| 30 | 1.925 | 6.000 | 2.685 | 1.0375 | 1.890 | 0.0625 |
| 40 | 1.924 | 6.000 | 2.685 | 1.0380 | 1.890 | 0.0625 |
| 50 | 0.708 | 6.000 | 2.685 | 1.6460 | 1.890 | 0.0625 |
| 60 | 0.708 | 6.000 | 2.685 | 1.6460 | 1.890 | 0.0625 |
| 75 | 0.708 | 6.000 | 2.685 | 1.6460 | 1.890 | 0.0625 |
| 100 | 2.879 | 10.250 | 3.567 | 1.5605 | 4.000 | 0.0625 |
| 125 | 2.879 | 10.250 | 3.567 | 1.5605 | 4.000 | 0.0625 |
| 150 | 2.985 | 10.250 | 3.567 | 1.5075 | 4.000 | 0.0625 |
| 200 | 2.985 | 10.250 | 3.488 | 1.5075 | 4.000 | 0.0625 |

Figure 28:
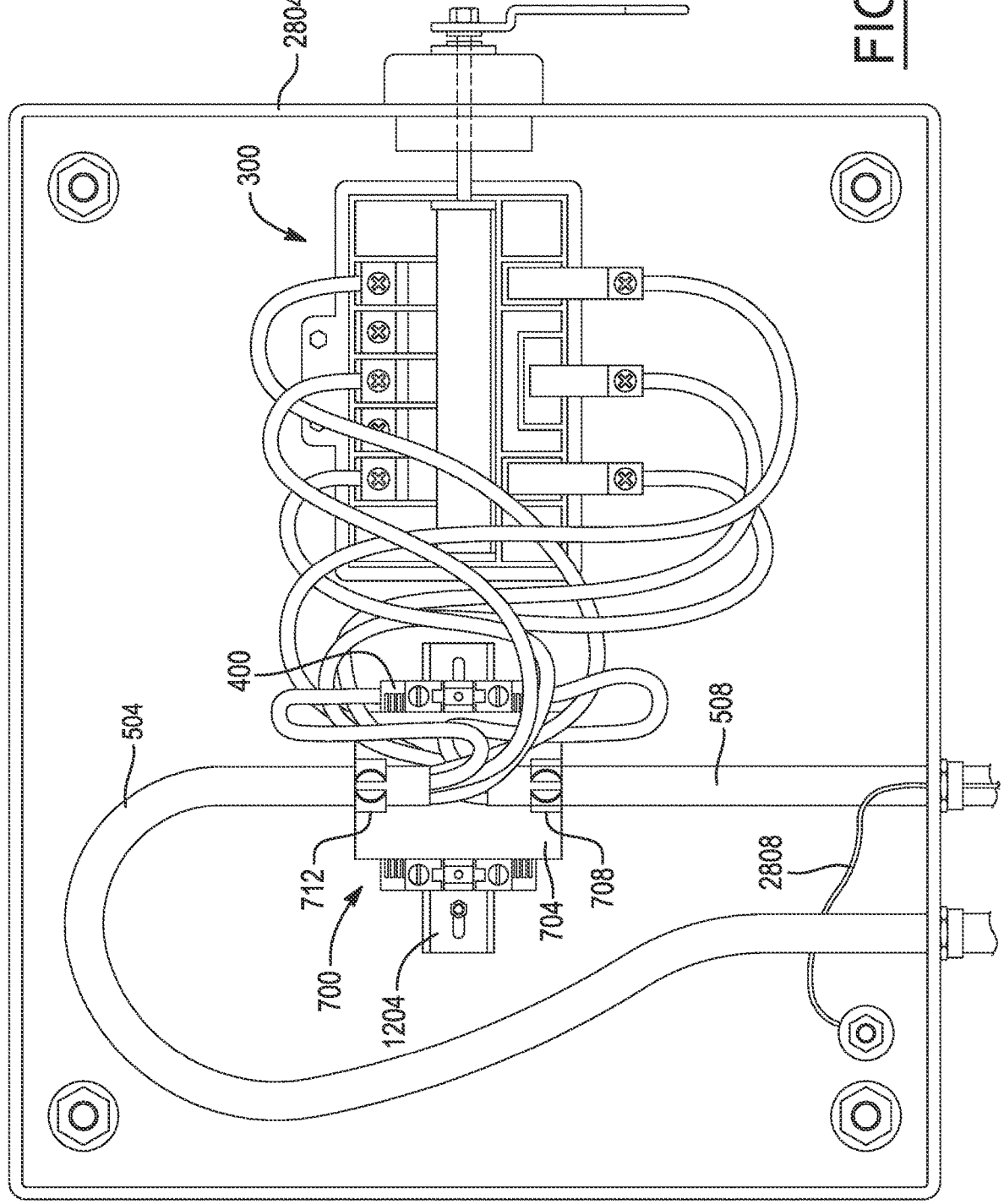
FIG. 28 includes an example implementation of the shield device of FIGS. 24-27 with a terminal block and a disconnect.

FIG. 28 includes an example implementation of the shield device 700 of FIGS. 24-27 with one of the terminal blocks 400 and the disconnect 300. As illustrated in FIG. 28, the DIN rail 804 may be omitted in various implementations, for example, when the disconnect 300 is used. As illustrated in FIG. 28, the second DIN rail 1204 may be mounted to and electrically connected to an enclosure 2804. A ground conductor 2808 may also electrically connect the enclosure 2804 to a ground reference potential, such as a ground reference potential of the load.

FIG. 29 includes a front view of an example of the shield devices 700 of FIGS. 24-28 with the two of the clamps 720. FIG. 30 includes a side view of the example of the shield devices 700 of FIGS. 24-28 with the two of the clamps 720.

The clamps 720 may be configured to grasp the insulators 1208 of the shielded cable and vertically support the shielded cable. The clamps 720 may be (electrically) non-conductive clamps. For example only, the clamps 720 may be made of a plastic. In various implementations, the clamps 720 may include tie wrap (e.g., zip ties) that encircle the clamps 720 and that extend through holes 2904 in the electrical conductor 704. The clamps 720 may be manually adjustable or non-adjustable. In various implementations, only one insulator clamp may be provided with the second shield connector 712. Providing the clamp may help achieve one or more certification requirements of a certification body, such as a certification requirement of Underwriters Laboratories (UL).

Example dimensions for the example of FIGS. 29-30 are as follows for different motors having different HP ratings.

| HP | A | E | F | J | M | O |
|---|---|---|---|---|---|---|
| 1 | 3.00 | 0.551 | 0.315 | 1.315 | 0.8425 | 0.0625 |
| 2 | 3.00 | 0.551 | 0.315 | 1.315 | 0.8425 | 0.0625 |
| 3 | 3.00 | 0.551 | 0.315 | 1.315 | 0.8425 | 0.0625 |
| 5 | 3.00 | 0.551 | 0.315 | 1.381 | 0.8095 | 0.0625 |
| 10 | 3.00 | 0.551 | 0.315 | 1.381 | 0.8095 | 0.0625 |
| 15 | 3.00 | 0.827 | 0.315 | 1.472 | 0.7640 | 0.0625 |
| 20 | 4.00 | 0.827 | 0.315 | 1.925 | 1.0375 | 0.0625 |
| 25 | 4.00 | 0.827 | 0.315 | 1.925 | 1.0375 | 0.0625 |
| 30 | 4.00 | 0.827 | 0.315 | 1.925 | 1.0375 | 0.0625 |
| 40 | 4.00 | 1.043 | 0.315 | 1.924 | 1.0380 | 0.0625 |
| 50 | 4.00 | 1.378 | 0.315 | 0.708 | 1.6460 | 0.0625 |
| 60 | 4.00 | 1.378 | 0.315 | 0.708 | 1.6460 | 0.0625 |
| 75 | 4.00 | 1.378 | 0.315 | 0.708 | 1.6460 | 0.0625 |
| 100 | 6.00 | 1.902 | 0.433 | 2.879 | 1.5605 | 0.0625 |
| 125 | 6.00 | 1.902 | 0.433 | 2.879 | 1.5605 | 0.0625 |
| 150 | 6.00 | 1.902 | 0.433 | 2.985 | 1.5075 | 0.0625 |
| 200 | 6.00 | 2.165 | 0.512 | 2.985 | 1.5075 | 0.0625 |

-continued

| HP | Q | S | T | V | W | X |
|---|---|---|---|---|---|---|
| 1 | 1.000 | 0.426 | 0.125 | 1.750 | 0.5625 | 0.188 |
| 2 | 1.000 | 0.426 | 0.125 | 1.750 | 0.5625 | 0.188 |
| 3 | 1.000 | 0.426 | 0.125 | 1.750 | 0.5625 | 0.188 |
| 5 | 1.000 | 0.426 | 0.125 | 1.750 | 0.5625 | 0.188 |
| 10 | 1.000 | 0.426 | 0.125 | 1.750 | 0.5625 | 0.188 |
| 15 | 1.000 | 0.702 | 0.125 | 1.750 | 0.5625 | 0.188 |
| 20 | 1.000 | 0.702 | 0.125 | 1.750 | 0.5625 | 0.188 |
| 25 | 1.000 | 0.702 | 0.125 | 1.750 | 0.5625 | 0.188 |
| 30 | 1.000 | 0.702 | 0.125 | 1.750 | 0.5625 | 0.188 |
| 40 | 1.000 | 0.918 | 0.125 | 1.750 | 0.5625 | 0.188 |
| 50 | 1.000 | 1.253 | 0.250 | 1.750 | 0.5625 | 0.188 |
| 60 | 1.000 | 1.253 | 0.250 | 1.750 | 0.5625 | 0.188 |
| 75 | 1.000 | 1.253 | 0.250 | 1.750 | 0.5625 | 0.188 |
| 100 | 1.000 | 1.777 | 0.250 | 1.750 | 0.5625 | 0.188 |
| 125 | 1.000 | 1.777 | 0.250 | 1.750 | 0.5625 | 0.188 |
| 150 | 1.000 | 1.777 | 0.250 | 1.750 | 0.5625 | 0.188 |
| 200 | 1.000 | 2.040 | 0.250 | 1.750 | 0.5625 | 0.188 |

Figure 32:
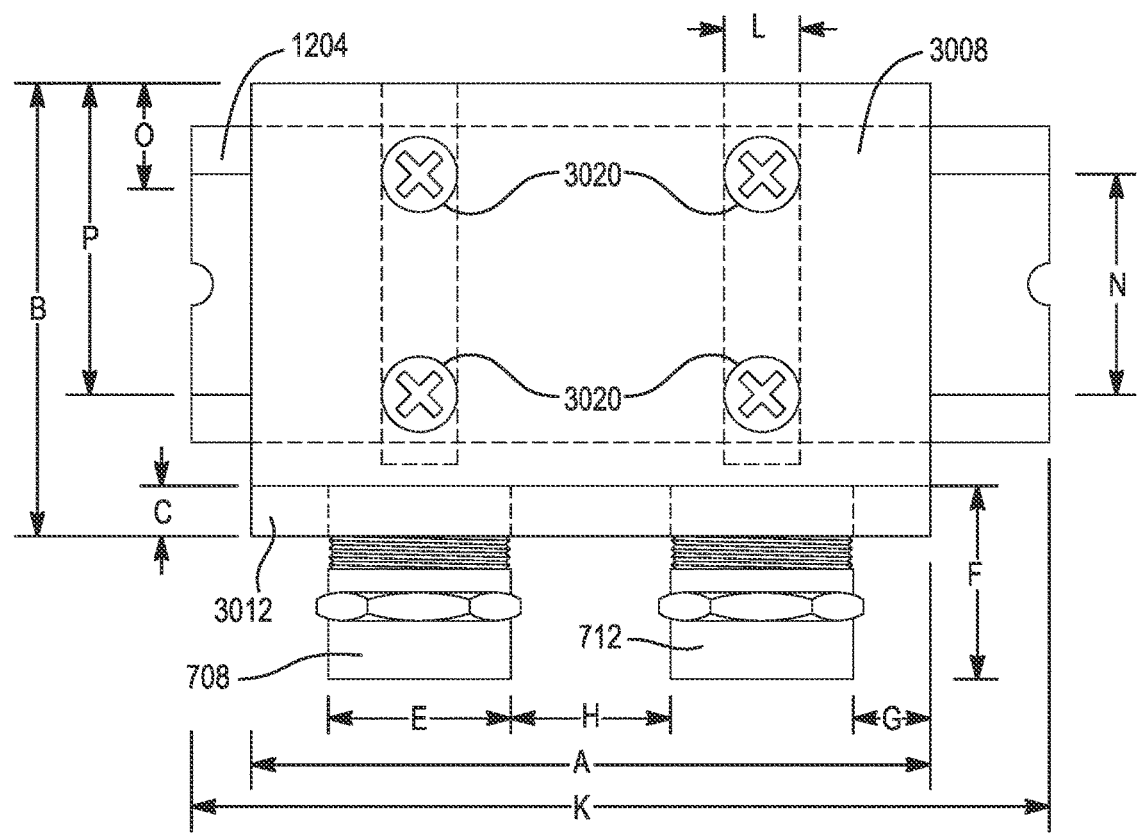
FIG. 32 is a front view of the example implementation of the shield device of FIG. 31.
Figure 33:
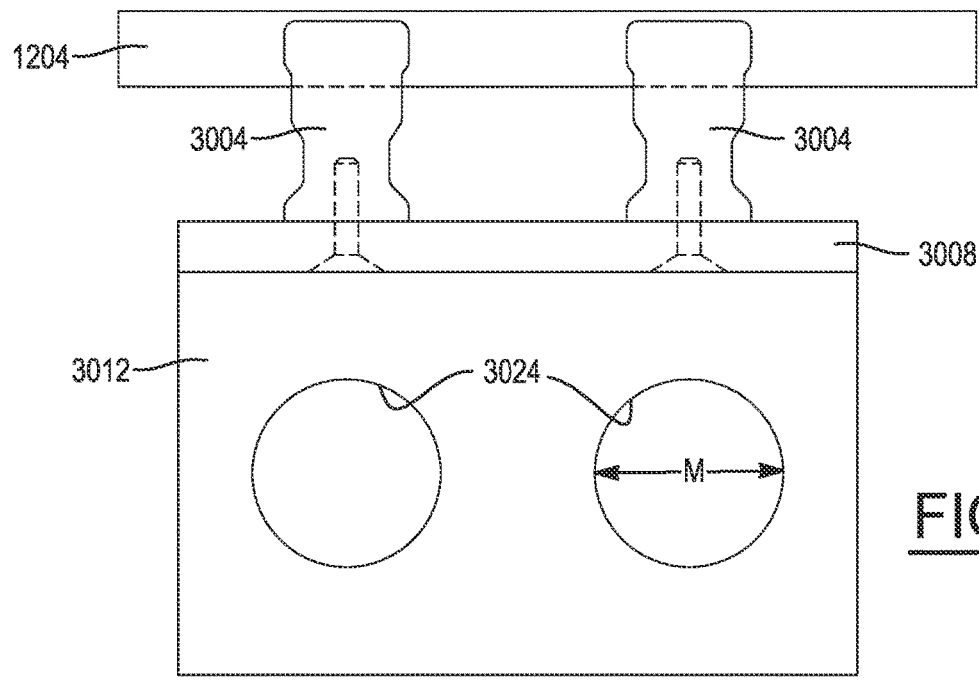
FIG. 33 is a top view of the example implementation of the shield device of FIG. 31.

FIG. 31 is a side view of an example implementation of the shield device 700. FIG. 32 is a front view of the example implementation of the shield device 700 of FIG. 31. FIG. 33 is a top view of the example implementation of the shield device 700 of FIG. 31.

The shield device 700 includes the first shield connector 708, the second shield connector 712, and the electrical conductor 704. In this example, the shield device 700 includes one or more DIN rail connectors 3004. While the example of two DIN rail connectors 3004 is shown, the shield device 700 may include one DIN rail connector 3004 or more than two DIN rail connectors 3004.

The electrical conductor 704 may have an L-shaped cross-section, as illustrated in FIG. 31. The electrical conductor may be made of aluminum or another suitable electrically conductive material. Having the L-shaped cross-section, the electrical conductor 704 includes a vertical portion 3008 and a horizontal portion 3012 that is perpendicular to the vertical portion 3008.

The DIN rail connector(s) 3004 are configured to couple (and hang) the shield device 700 to the second DIN rail 1204. The second DIN rail 1204 may be, for example, a 15 mm DIN rail, a 35 mm DIN rail, or another suitable type of DIN rail. The DIN rail connectors 3004 have one or more features 3016 configured to securely hold the shield device 700 to the second DIN rail 1204. The DIN rail connectors 3004 are also releasable from the second DIN rail 1204.

The DIN rail connectors 3004 are electrical insulators and may be made of, for example, a dielectric material or another suitable type of electrically insulative/isolative material. The DIN rail connectors 3004 therefore electrically isolate the electrical conductor 704 from the second DIN rail 1204 and any other components that are electrically connected to the second DIN rail.

The DIN rail connectors 3004 may be fixed to the electrical conductor 704 via one or more fasteners, such as screws 3020. In various implementations, the DIN rail connectors 3004 may be fixed to the electrical conductor 704 in another suitable manner, such as via an adhesive or via one or more other types of fasteners. In an example, the screws 3020 may be #6-32×⅜" screws. The holes for the screws 3020 through the electrical conductor 704 may be countersunk.

The shield device 700 includes apertures 3024 in the horizontal portion 3012 for the first and second shield connectors 708 and 712. The first and second shield connectors 708 and 712 are electrically conductive and are electrically connected to the electrical conductor 704. For example, threads may be formed on inner surfaces of the apertures 3024, and the first and second shield connectors 708 and 712 may include threads formed on their radially outer surfaces. The threads on the outer surfaces of the first and second shield connectors 708 and 712 may be threaded onto the threads on the inner surfaces of the apertures 3024. In various implementations, the first and second shield connectors 708 and 712 may be fixed to the electrical conductor 704 in another suitable manner, such as via an electrically conductive adhesive or via one or more other types of fasteners. In this example, the first and second shield connectors 708 and 712 are electrically conductive cable glands, for example, from the Lapp Group. The first and second shield connectors 708 and 712 may be made of, for example, aluminum, steel, copper, or another suitable electrically conductive material.

The first and second shield connectors 708 and 712 are configured to electrically contact as much of the 360 degree surface area of the shield portions (once exposed) of the first and second lengths 504 and 508 of the shielded cable as possible. The first and second shield connectors 708 and 712 engage and hold the shield portions of the first and second lengths 504 and 508 and electrically connect the shield portions with the electrical conductor 704.

Example dimensions for the example of FIGS. 31-33 are as follows for different motors having different HP ratings.

| HP | A | B | C | D | E | F | G | H | I |
|---|---|---|---|---|---|---|---|---|---|
| 1 | 3.00 | 2.00 | 0.25 | 0.25 | 0.945 | 1.674 | 0.370 | 0.370 | 1.625 |
| 2 | 3.00 | 2.00 | 0.25 | 0.25 | 0.945 | 1.674 | 0.370 | 0.370 | 1.625 |
| 3 | 3.00 | 2.00 | 0.25 | 0.25 | 0.945 | 1.674 | 0.370 | 0.370 | 1.625 |
| 5 | 3.00 | 2.00 | 0.25 | 0.25 | 1.142 | 1.753 | 0.239 | 0.239 | 1.625 |
| 10 | 3.00 | 2.00 | 0.25 | 0.25 | 1.142 | 1.753 | 0.239 | 0.239 | 1.625 |
| 15 | 3.00 | 2.00 | 0.25 | 0.25 | 1.418 | 1.93 | 0.055 | 0.055 | 1.625 |
| 20 | 4.00 | 2.00 | 0.25 | 0.25 | 1.773 | 2.264 | 0.151 | 0.151 | 1.625 |
| 25 | 4.00 | 2.00 | 0.25 | 0.25 | 1.773 | 2.264 | 0.151 | 0.151 | 1.625 |
| 30 | 4.00 | 2.00 | 0.25 | 0.25 | 1.773 | 2.264 | 0.151 | 0.151 | 1.625 |
| 40 | 4.00 | 2.00 | 0.25 | 0.25 | 1.773 | 2.264 | 0.151 | 0.151 | 1.625 |
| 50 | 6.00 | 3.00 | 0.25 | 0.25 | 2.127 | 2.423 | 0.582 | 0.582 | 1.625 |
| 60 | 6.00 | 3.00 | 0.25 | 0.25 | 2.127 | 2.423 | 0.582 | 0.582 | 1.625 |
| 75 | 6.00 | 3.00 | 0.25 | 0.25 | 2.127 | 2.423 | 0.582 | 0.582 | 1.625 |
| 100 | 6.00 | 3.00 | 0.25 | 0.25 | 2.639 | 2.482 | 0.241 | 0.241 | 1.625 |
| 125 | 6.00 | 3.00 | 0.25 | 0.25 | 2.639 | 2.482 | 0.241 | 0.241 | 1.625 |
| 150 | 7.00 | 3.00 | 0.25 | 0.25 | 2.955 | 2.836 | 0.363 | 0.363 | 1.625 |
| 200 | 7.00 | 3.00 | 0.25 | 0.25 | 2.955 | 2.836 | 0.363 | 0.363 | 1.625 |
| 250 | 8.00 | 3.00 | 0.25 | 0.250 | 3.743 | 4.137 | 0.171 | 0.171 | 1.625 |
| 300 | 8.00 | 3.00 | 0.25 | 0.25 | 3.743 | 4.137 | 0.171 | 0.171 | 1.625 |

| HP | J | K | L | M1 | N | O | M | P | AF |
|---|---|---|---|---|---|---|---|---|---|
| 1 | 0.75 | 5.000 | 0.375 | NPT ½ | 1.000 | 0.3125 | 0.500 | 1.313 | 2.00 |
| 2 | 0.75 | 5.000 | 0.375 | NPT ½ | 1.000 | 0.3125 | 0.500 | 1.313 | 2.00 |
| 3 | 0.75 | 5.000 | 0.375 | NPT ½ | 1.000 | 0.3125 | 0.500 | 1.313 | 2.00 |
| 5 | 0.75 | 5.000 | 0.375 | NPT ¾ | 1.000 | 0.3125 | 0.750 | 1.313 | 2.00 |
| 10 | 0.75 | 5.000 | 0.375 | NPT ¾ | 1.000 | 0.3125 | 0.750 | 1.313 | 2.00 |
| 15 | 0.75 | 5.000 | 0.375 | NPT 1 | 1.000 | 0.3125 | 1.000 | 1.313 | 2.00 |
| 20 | 0.75 | 6.000 | 0.375 | NPT 1¼ | 1.000 | 0.3125 | 1.250 | 1.313 | 3.00 |
| 25 | 0.75 | 6.000 | 0.375 | NPT 1¼ | 1.000 | 0.3125 | 1.250 | 1.313 | 3.00 |
| 30 | 0.75 | 6.000 | 0.375 | NPT 1¼ | 1.000 | 0.3125 | 1.250 | 1.313 | 3.00 |
| 40 | 0.75 | 6.000 | 0.375 | NPT 1¼ | 1.000 | 0.3125 | 1.250 | 1.313 | 3.00 |
| 50 | 0.75 | 8.000 | 0.375 | NPT 1½ | 1.000 | 0.3125 | 1.500 | 1.313 | 3.00 |
| 60 | 0.75 | 8.000 | 0.375 | NPT 1½ | 1.000 | 0.3125 | 1.500 | 1.313 | 3.00 |
| 75 | 0.75 | 8.000 | 0.375 | NPT 1½ | 1.000 | 0.3125 | 1.500 | 1.313 | 3.00 |
| 100 | 0.75 | 10.250 | 0.375 | NPT 2 | 1.000 | 0.3125 | 2.000 | 1.313 | 3.50 |
| 125 | 0.75 | 10.250 | 0.375 | NPT 2 | 1.000 | 0.3125 | 2.000 | 1.313 | 3.50 |
| 150 | 0.75 | 11.250 | 0.375 | NPT 2 plus | 1.000 | 0.3125 | 2.250 | 1.313 | 4.00 |
| 200 | 0.75 | 11.250 | 0.375 | NPT 2 plus | 1.000 | 0.3125 | 2.250 | 1.313 | 4.00 |
| 250 | 0.75 | 9.000 | 0.375 | M75 × 1.5 | 1.000 | 0.3125 | 2.250 | 1.313 | 5.00 |
| 300 | 0.75 | 9.000 | 0.375 | M75 × 1.5 plus | 1.000 | 0.3125 | 2.250 | 1.313 | 5.00 |

Figure 34:
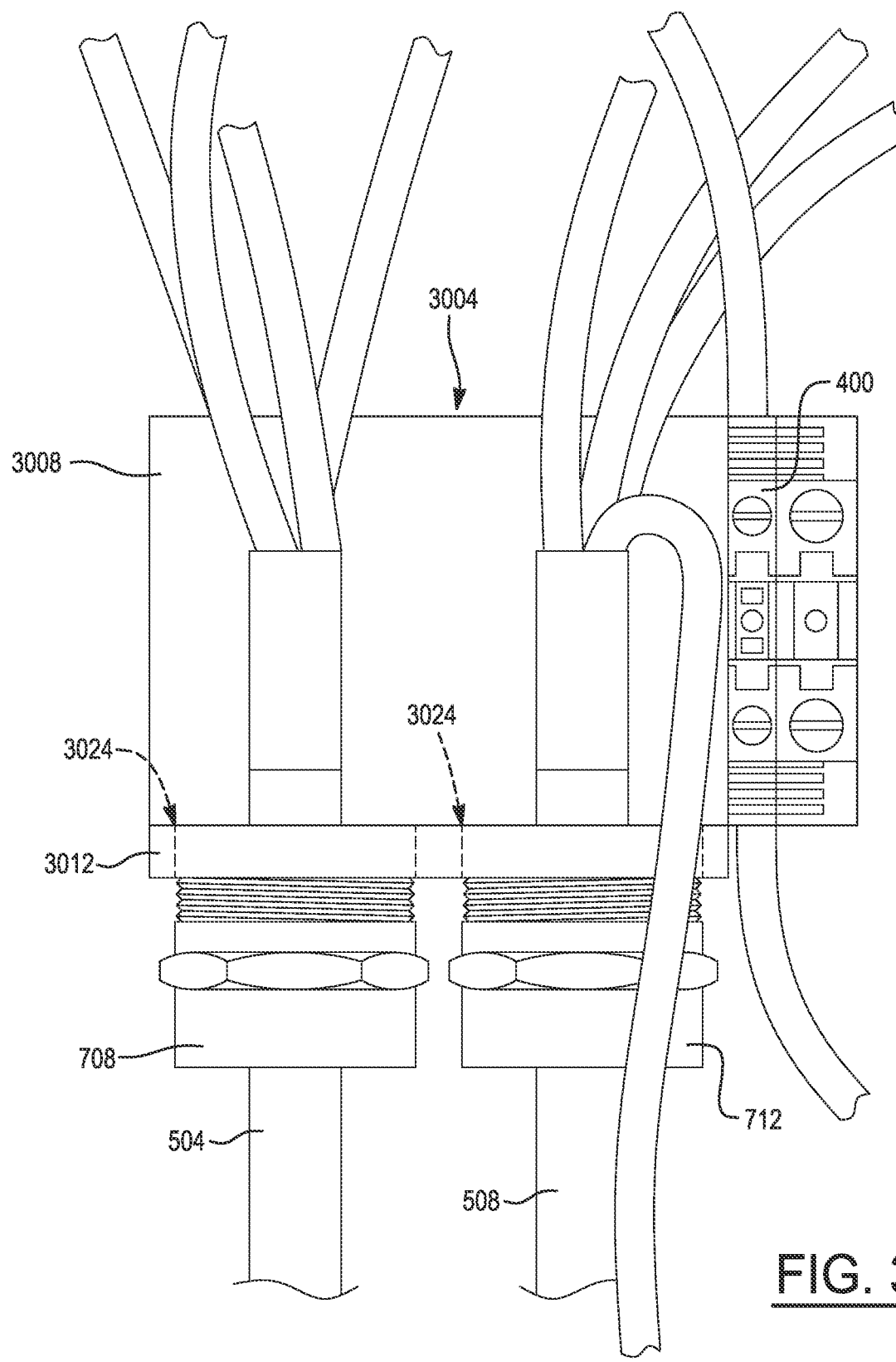
FIG. 34 is a close up front view of the example of the shield device of FIGS. 31-33.
Figure 35:
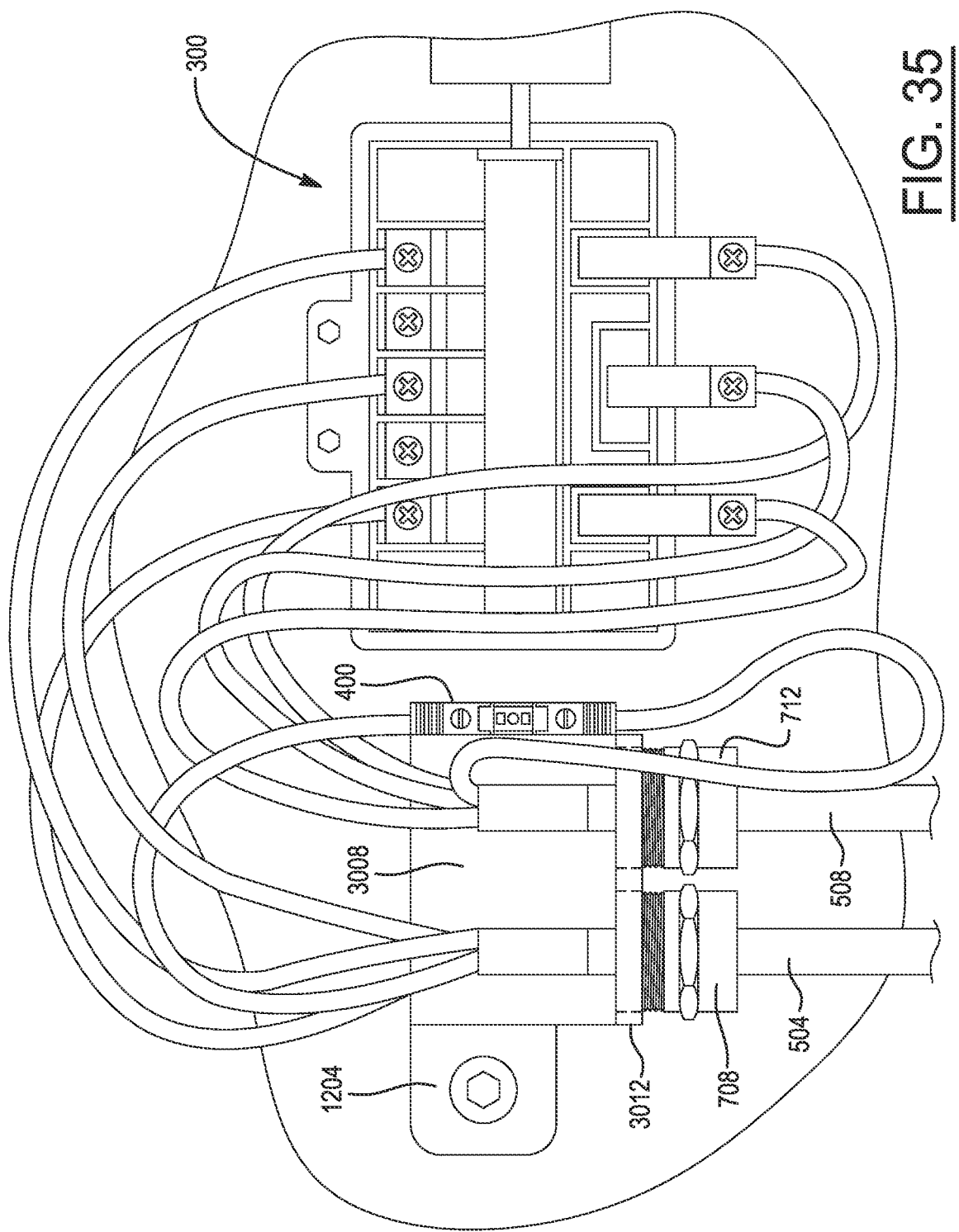
FIG. 35 is a zoomed out front side view of the shield device of FIGS. 31-33.

FIG. 34 is a close up front view of the example of the shield device 700 of FIGS. 31-33. FIG. 35 is a zoomed out front side view of the shield device 700 of FIGS. 31-33. FIG. 35 also illustrates the disconnect 300 and one of the terminal blocks 400. While the example of FIG. 35 illustrates the inclusion of an isolator, the example of FIG. 35 could alternatively be hung from a DIN rail.

Figure 36:
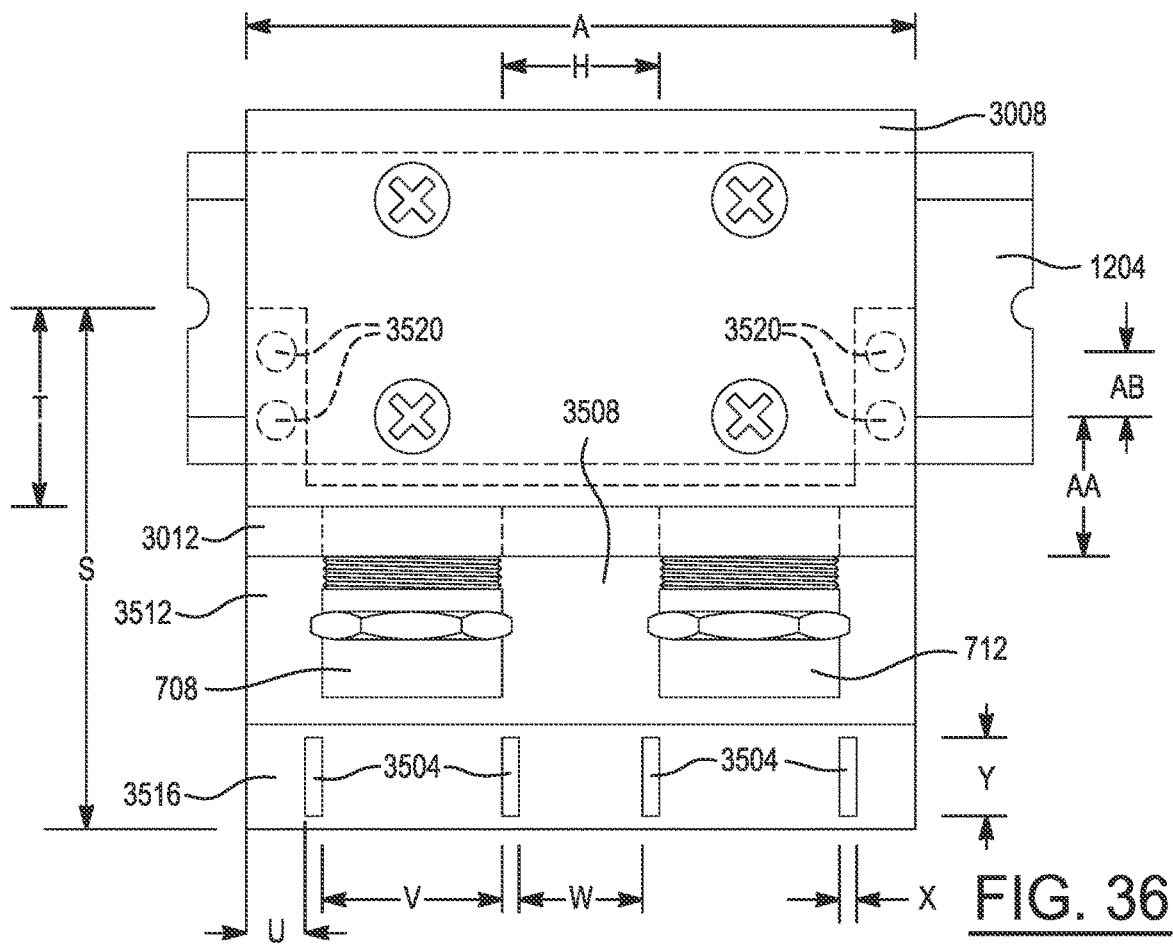
FIG. 36 includes a front view of an example of the shield devices of FIGS. 31-35 with an insulator clamp.
Figure 37:
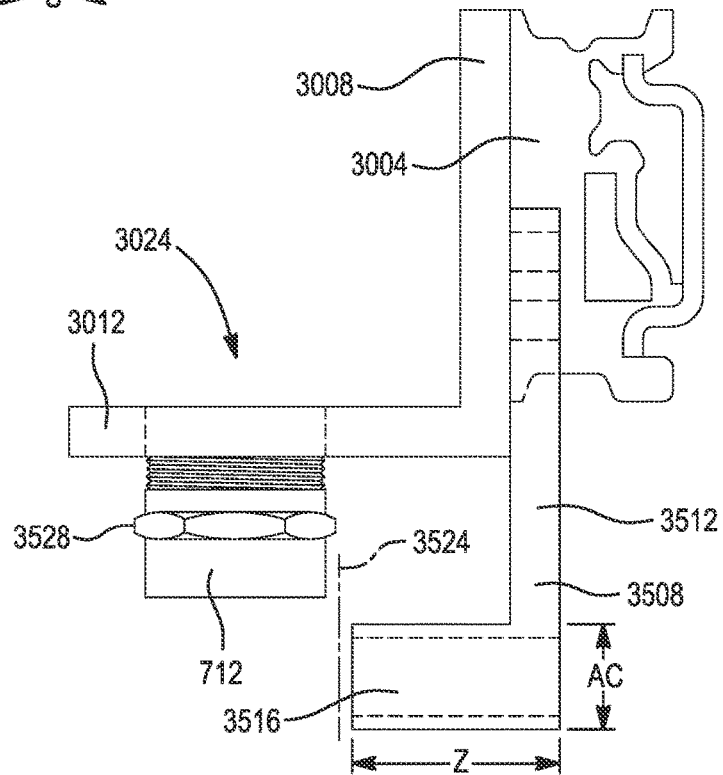
FIG. 37 includes a side view of the example of the shield devices of FIGS. 31-35 with the insulator clamps.

FIG. 36 includes a front view of an example of the shield devices 700 of FIGS. 31-35 with the clamps 720. FIG. 37 includes a side view of the example of the shield devices 700 of FIGS. 31-35 with the clamps 720.

The clamps 720 may be configured to grasp the insulators 1208 of the shielded cable and vertically support the shielded cables. The clamps 720 may be non-conductive (electrically) clamps. For example only, the clamps 720 may be made of a plastic. In various implementations, the clamps 720 may include tie wraps (e.g., zip ties) that encircle the insulators 1208 and that extend through holes 3504 in a clamp bracket 3508. The clamps 720 may be manually adjustable or non-adjustable. Providing the clamps 720 may help achieve one or more certification requirements, such as a certification requirement of Underwriters Laboratories (UL).

The clamp bracket 3508 may have an L-shaped cross-section as shown in FIG. 37. Having the L-shaped cross-section, the clamp bracket 3508 includes a vertical portion 3512 and a horizontal portion 3516 that is perpendicular to the vertical portion 3512. The holes 3504 extend through the horizontal portion 3516. The clamp bracket 3508 may be fixed to the electrical conductor 704, such as via one or more fasteners 3520 or in another suitable manner. The fasteners 3520 may be, for example, screws or another suitable type of fastener. The clamp bracket 3508 may be an electrical insulator and may be made of, for example, a dielectric material or another suitable type of electrically insulative/isolative material. This may reduce cost. Alternatively, the clamp bracket 3508 may be electrically conductive.

Example dimensions for the example of FIGS. 36-37 are as follows for different motors having different HP ratings.

| HP | A | H | S | T | U | V | W |
|---|---|---|---|---|---|---|---|
| 1 | 3.00 | 0.370 | 3.674 | 1.000 | 0.537 | 0.445 | 0.537 |
| 2 | 3.00 | 0.370 | 3.674 | 1.000 | 0.537 | 0.445 | 0.537 |
| 3 | 3.00 | 0.370 | 3.674 | 1.000 | 0.537 | 0.445 | 0.537 |
| 5 | 3.00 | 0.239 | 3.753 | 1.000 | 0.405 | 0.642 | 0.405 |
| 10 | 3.00 | 0.239 | 3.753 | 1.000 | 0.405 | 0.642 | 0.405 |
| 15 | 3.00 | 0.055 | 3.930 | 1.000 | 0.221 | 0.918 | 0.221 |
| 20 | 4.00 | 0.151 | 4.264 | 1.000 | 0.318 | 1.273 | 0.318 |
| 25 | 4.00 | 0.151 | 4.264 | 1.000 | 0.318 | 1.273 | 0.318 |
| 30 | 4.00 | 0.151 | 4.264 | 1.000 | 0.318 | 1.273 | 0.318 |
| 40 | 4.00 | 0.151 | 4.264 | 1.000 | 0.318 | 1.273 | 0.318 |
| 50 | 6.00 | 0.582 | 4.423 | 1.000 | 0.582 | 1.627 | 0.582 |
| 60 | 6.00 | 0.582 | 4.423 | 1.000 | 0.582 | 1.627 | 0.582 |
| 75 | 6.00 | 0.582 | 4.423 | 1.000 | 0.582 | 1.627 | 0.582 |
| 100 | 6.00 | 0.241 | 4.482 | 1.000 | 0.324 | 2.014 | 0.324 |
| 125 | 6.00 | 0.241 | 4.482 | 1.000 | 0.324 | 2.014 | 0.324 |
| 150 | 7.00 | 0.363 | 4.836 | 1.000 | 0.863 | 1.705 | 0.863 |
| 200 | 7.00 | 0.363 | 4.836 | 1.000 | 0.863 | 1.705 | 0.863 |
| 250 | 8.00 | 0.171 | 6.137 | 1.000 | 1.171 | 1.743 | 1.171 |
| 300 | 8.00 | 0.171 | 6.137 | 1.000 | 1.171 | 1.743 | 1.171 |

| HP | X | Y | Z | AA | AB | AC |
|---|---|---|---|---|---|---|
| 1 | 0.125 | 0.375 | 1.125 | 0.375 | 0.375 | 1.000 |
| 2 | 0.125 | 0.375 | 1.125 | 0.375 | 0.375 | 1.000 |
| 3 | 0.125 | 0.375 | 1.125 | 0.375 | 0.375 | 1.000 |
| 5 | 0.125 | 0.375 | 1.000 | 0.375 | 0.375 | 1.000 |
| 10 | 0.125 | 0.375 | 1.000 | 0.375 | 0.375 | 1.000 |
| 15 | 0.125 | 0.375 | 0.875 | 0.375 | 0.375 | 1.000 |
| 20 | 0.125 | 0.375 | 0.750 | 0.375 | 0.375 | 1.000 |
| 25 | 0.125 | 0.375 | 0.750 | 0.375 | 0.375 | 1.000 |
| 30 | 0.125 | 0.375 | 0.750 | 0.375 | 0.375 | 1.000 |
| 40 | 0.125 | 0.375 | 0.750 | 0.375 | 0.375 | 1.000 |
| 50 | 0.250 | 0.625 | 1.125 | 0.375 | 0.375 | 1.000 |
| 60 | 0.250 | 0.625 | 1.125 | 0.375 | 0.375 | 1.000 |
| 75 | 0.250 | 0.625 | 1.125 | 0.375 | 0.375 | 1.000 |
| 100 | 0.250 | 0.625 | 0.875 | 0.375 | 0.375 | 1.000 |
| 125 | 0.250 | 0.625 | 0.875 | 0.375 | 0.375 | 1.000 |
| 150 | 0.250 | 0.625 | 0.750 | 0.375 | 0.375 | 1.000 |
| 200 | 0.250 | 0.625 | 0.750 | 0.375 | 0.375 | 1.000 |
| 250 | 0.250 | 0.625 | 0.750 | 0.375 | 0.375 | 1.000 |
| 300 | 0.250 | 0.625 | 0.750 | 0.375 | 0.375 | 1.000 |

As shown in FIG. 37, the horizontal portion 3516 of the clamp bracket 3508 may extend horizontally (dimension Z in FIG. 37) such that an end face 3524 of the horizontal portion 3516 is vertically aligned with or substantially vertically aligned with an outer portion 3528 of the first and second shield connectors 708 and 712. Substantially vertically aligned may mean within 3 millimeters of a closest point.

Figure 38:
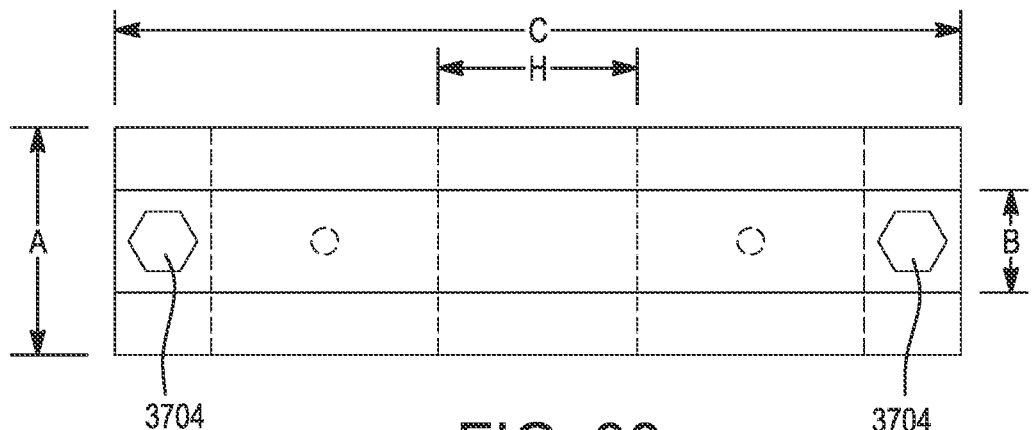
FIG. 38 includes a front view of an example of an insulator clamps that can be provided separately from the shield device.
Figure 39:
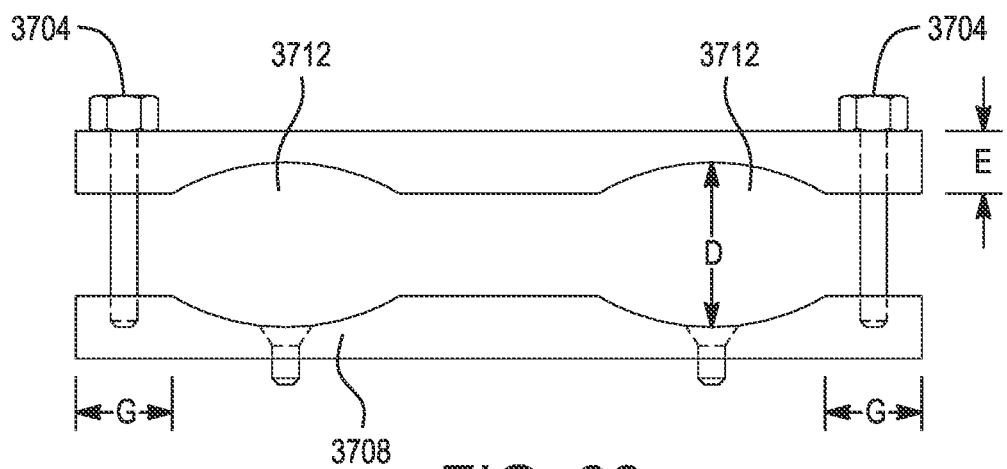
FIG. 39 includes a top view of the example of the insulator clamp of FIG. 38.
Figure 40:
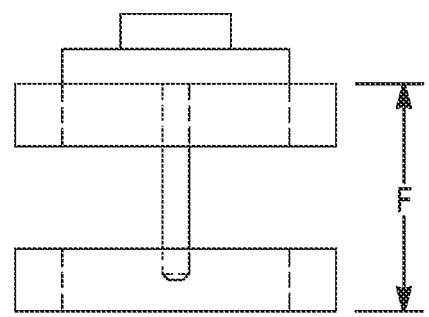
FIG. 40 includes a side view of the example of the insulator clamps of FIG. 38.

In various implementations, the clamps 720 may be separate from the shield device 700. FIG. 38 includes a front view of an example of the clamps 720 that can be provided separately from the shield device 700. FIG. 39 includes a top view of the example of the clamps 720 of FIG. 38. FIG. 40 includes a side view of the example of the clamps 720 of FIG. 38.

As stated above, the clamps 720 may be adjustable. For example, the clamps 720 may include one or more screws 3704 that engage threads in a portion 3708 of the insulator clamps 720. Turning of the screws 3704 adjusts dimensions of inner apertures 3712 of the clamps 720 to retain and release the shielded cables. In the example of FIGS. 38-40, the clamps 720 may be mounted, for example, to an enclosure vertically below the shield device 700.

Example dimensions for the example of FIGS. 38-40 are as follows for different motors having different HP ratings.

| HP | A | B | C | D | E | F | G | H |
|---|---|---|---|---|---|---|---|---|
| 1 | 1.000 | 0.500 | 3.00 | 0.509 | 0.500 | 1.509 | 0.588 | 0.806 |
| 2 | 1.000 | 0.500 | 3.00 | 0.509 | 0.500 | 1.509 | 0.588 | 0.806 |
| 3 | 1.000 | 0.500 | 3.00 | 0.509 | 0.500 | 1.509 | 0.588 | 0.806 |
| 5 | 1.000 | 0.500 | 3.00 | 0.582 | 0.500 | 1.582 | 0.519 | 0.799 |
| 10 | 1.000 | 0.500 | 3.00 | 0.582 | 0.500 | 1.582 | 0.519 | 0.799 |
| 15 | 1.000 | 0.500 | 3.00 | 0.656 | 0.500 | 1.656 | 0.436 | 0.817 |
| 20 | 1.000 | 0.500 | 4.00 | 0.707 | 0.500 | 1.707 | 0.684 | 1.217 |
| 25 | 1.000 | 0.500 | 4.00 | 0.807 | 0.500 | 1.807 | 0.634 | 1.117 |
| 30 | 1.000 | 0.500 | 4.00 | 0.807 | 0.500 | 1.807 | 0.634 | 1.117 |
| 40 | 1.000 | 0.500 | 4.00 | 1.022 | 0.500 | 2.022 | 0.527 | 0.902 |
| 50 | 1.000 | 0.500 | 6.00 | 1.158 | 0.500 | 2.158 | 1.067 | 1.551 |
| 60 | 1.000 | 0.500 | 6.00 | 1.332 | 0.500 | 2.332 | 0.980 | 1.377 |
| 75 | 1.000 | 0.500 | 6.00 | 1.332 | 0.500 | 2.332 | 0.980 | 1.377 |
| 100 | 2.000 | 1.000 | 6.00 | 1.328 | 1.000 | 2.328 | 0.896 | 1.552 |
| 125 | 2.000 | 1.000 | 6.00 | 1.396 | 1.000 | 2.396 | 0.862 | 1.484 |
| 150 | 3.000 | 1.000 | 7.00 | 1.801 | 1.000 | 2.801 | 0.940 | 1.517 |
| 200 | 3.000 | 1.000 | 7.00 | 1.996 | 1.000 | 2.996 | 0.843 | 1.322 |
| 250 | 4.000 | 1.000 | 8.00 | 2.229 | 1.000 | 3.229 | 0.928 | 1.685 |
| 300 | 4.000 | 1.000 | 8.00 | 2.468 | 1.000 | 3.468 | 0.809 | 1.446 |

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) or power that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A shield device comprising:
a first electrical conductor;
an electrical insulator that is configured to electrically insulate the first electrical conductor from a second electrical conductor;
a first shield connector configured to:
directly contact at least 180 degrees of a first circumference of a first shield that surrounds at least two first insulated conductors of a first section of a shielded cable; and
electrically connect the first shield with the first electrical conductor; and
a second shield connector configured to:
directly contact at least 180 degrees of a second circumference of a second shield that surrounds at least two second insulated conductors of a second section of the shielded cable; and
electrically connect the second shield with the first electrical conductor.

2. The shield device of claim 1 wherein the first electrical conductor is planar.

3. The shield device of claim 2 further comprising a second electrical insulator located between the first electrical conductor and a DIN rail and configured to electrically insulate the first electrical conductor from the DIN rail.

4. The shield device of claim 3 further comprising the DIN rail.

5. The shield device of claim 4 wherein the DIN rail is configured to hang one or more terminal blocks from the DIN rail.

6. The shield device of claim 3 wherein the second electrical insulator includes a dielectric paper.

7. The shield device of claim 2 wherein centers of the first and second shield connectors are offset from a vertical centerline of the shield device.

8. The shield device of claim 2 wherein centers of the first and second shield connectors are located on a vertical centerline of the shield device.

9. The shield device of claim 2 further comprising a clamping device configured to clamp a second electrical insulator that surrounds the second shield of the second section of the shielded cable.

10. A shield device comprising:
a first electrical conductor;
an electrical insulator that is configured to electrically isolate the first electrical conductor from a second electrical conductor;
a first shield connector configured to:
directly contact a first shield; and
electrically connect the first shield with the first electrical conductor; and
a second shield connector configured to:
directly contact at least 180 degrees of a circumference of a second shield that surrounds at least two insulated conductors of a second section of a shielded cable; and
electrically connect the second shield with the first electrical conductor.

11. The shield device of claim 10 wherein the first electrical conductor is planar.

12. The shield device of claim 11 further comprising a clamping device configured to clamp a second electrical insulator that surrounds the second shield of the second section of the shielded cable.

13. The shield device of claim 11 wherein the first shield is a flat braid shield.

14. The shield device of claim 11 wherein the first shield connector includes an electrically conductive fastener configured to fasten the first shield to the first electrical conductor.

15. The shield device of claim 14 wherein the first shield includes a flat braid connector that is electrically connected to an end of the first shield.

16. The shield device of claim 15 wherein the flat braid connector includes an aperture through which the fastener extends.

17. A shield device comprising:
a first electrical conductor having a first portion and a second portion;
an electrical insulator that is fixed to the first portion and that is configured to electrically isolate the first electrical conductor from a second electrical conductor;
a first cable gland that is engaged with the second portion of the first electrical conductor and that is configured to:
engage a first shield that surrounds at least two first insulated conductors of a first section of a shielded cable; and
electrically connect the first shield with the first electrical conductor; and
a second cable gland that is engaged with the second portion of the first electrical conductor and that is configured to:

engage a second shield that surrounds at least two second insulated conductors of a second section of the shielded cable; and electrically connect the second shield with the first electrical conductor.

18. The shield device of claim 17 wherein the second portion is perpendicular to the first portion.

19. The shield device of claim 17 wherein:

the first cable gland is coupled to a first circular aperture in the second portion of the first electrical conductor; and the second cable gland is coupled to a second circular aperture in the second portion of the first electrical conductor.

20. The shield device of claim 17 wherein the first electrical conductor is made of aluminum.

21. The shield device of claim 17 further comprising a clamping device configured to clamp a first electrical insulator that surrounds the first shield of the first section of the shielded cable.

22. The shield device of claim 21 wherein the clamping device is further configured to clamp a second electrical insulator that surrounds the second shield of the second section of the shielded cable.

* * * * *